United States Patent
Norton et al.

(10) Patent No.: US 8,019,709 B2
(45) Date of Patent: Sep. 13, 2011

(54) METHOD AND SYSTEM FOR RULE-BASED CONTENT FILTERING

(75) Inventors: Richard Elliott Norton, Ste-Genevieve (CA); Louis-Rene Poirier-Beauchemin, Montreal (CA); Robert Héroux, Montreal (CA); Mario Joseph Leo Claude Lavalliere, Mascouche (CA)

(73) Assignee: Vantrix Corporation, Montreal, Quebec (CA)

( * ) Notice: Subject to any disclaimer, the term of this patent is extended or adjusted under 35 U.S.C. 154(b) by 574 days.

(21) Appl. No.: 12/266,353

(22) Filed: Nov. 6, 2008

(65) Prior Publication Data

US 2009/0125459 A1    May 14, 2009

Related U.S. Application Data

(60) Provisional application No. 60/986,835, filed on Nov. 9, 2007.

(51) Int. Cl.
*G06F 17/00* (2006.01)
*G06N 5/00* (2006.01)
(52) U.S. Cl. .......................................................... 706/45
(58) Field of Classification Search ........................ None
See application file for complete search history.

(56) References Cited

U.S. PATENT DOCUMENTS

| | | | |
|---|---|---|---|
| 6,421,733 B1 * | 7/2002 | Tso et al. ...................... | 709/246 |
| 7,120,702 B2 | 10/2006 | Huang | |
| 7,242,324 B2 * | 7/2007 | Lai et al. .......................... | 341/51 |
| 7,545,978 B2 * | 6/2009 | Amini et al. ................... | 382/170 |
| 2002/0049705 A1 | 4/2002 | Haviv-Segal | |
| 2006/0143162 A1 | 6/2006 | Bernacki | |
| 2006/0155852 A1 | 7/2006 | Mayer | |

FOREIGN PATENT DOCUMENTS

WO    WO 01/44933    6/2001

OTHER PUBLICATIONS

2003 IEEE Pacific Rim Conference on Communications Computers and Signal Processing (PACRIM 2003) (Cat., No. 03CH37490) Communications, Computers and signal Processing, 2003. PACRIM. 2003 IEEE Pacific Rim Conference on vol. 1 Digital Object Identifier: 10.1109/PACRIM.2003.1235703 Publication Year: 2003.*

(Continued)

*Primary Examiner* — Jeffrey A Gaffin
*Assistant Examiner* — Luis Sitiriche
(74) *Attorney, Agent, or Firm* — Victoria Donnelly; IP-Mex Inc.

(57) ABSTRACT

A system and method for content-filtering of data containers in a network supporting versatile communications services are disclosed. The content-filtering system is integrated with a content-adaptation system. Several server units handle data containers formulated at source according to different protocols. A content filtering process relies on characterizing each component of a container to produce a set of content descriptors and producing a set of binary conditions for each component according to a preset criterion for each descriptor. A set of rules is devised where each rule applies a respective Boolean expression to a subset of the conditions to prescribe a respective content-editing action. Methods of specifying and evaluating a rule's Boolean expression are disclosed. A formal graph is used to define inter-dependence of rules.

20 Claims, 28 Drawing Sheets

OTHER PUBLICATIONS

Large-scale and high-speed interconnection of multiple FDDIs using ATM-based backbone LAN, Tsukakoshi, M.; Takada, O.; Murakami, T.; Terada, M.; Yamaga, M.; INFOCOM '92. Eleventh Annual Joint Conference of the IEEE Computer and Communications Societies, IEEE Digital Object Identifier: 10.1109/INFOM.1992.263518 1992, pp. 2290-2298 v. 3.*

TASA: Telecommunication Alarm Sequence Analyzer or how to enjoy faults in your network, Hatonen, K.; Klemettinen, M.; Mannila, H.; Ronkainen, P.; Toivonen, H.; Network Operations and Management Symposium, 1996., IEEE vol. 2 Digital Object Identifier: 10.1109/NOMS.1996.539622 Publication Year: 1996, pp. 520-529 vol. 2.*

Modelling differentiated services in UMTS networks Al-Begain, K.; Awan, I.; Modeling, Analysis and Simulation of Computer Telecommunications Systems, 2003. MASCOTS 2003. 11th IEEE/ACM International Symposium on Digital Object Identifier: 10.1109/Mascot.2003.1240653 Publication Year: 2003, pp. 164-171.*

Multimedia Messaging Service, Media formats and codecs 3GPP TS 26.140, V 7.1.0, http://www.3gpp.org/ftp/specs/html-info/26140.htm, Jun. 2007.

"Multimedia Adaptation for the Multimedia Messaging Service" Stephane Coulombe and Guido Grassel, IEEE Communication Magazine, vol. 42, No. 7, p. 120-126, Jul. 2004.

OMA Multimedia Messaging Service, Architecture Overview, Approved Version 1.2 01, published by Open Mobile Alliance, available from http://www.openmobilealliance.org/release_program/mms_v1_2.html, Mar. 2005.

Nokia Multimedia Messaging Service Center, External Application Interface, Frequently Asked Questions, Reference for External Application Interface (EAIF) protocol available at http://www.forum.nokia.com/info/sw.nokia.com/id/ d0ee4125-3879-4482-b55d-90e3afe17a31/Ext_App_interface_FAQ.pdf.html published by Nokia, prior to Sep. 9, 2007.

* cited by examiner

METHOD AND SYSTEM FOR RULE-BASED CONTENT FILTERING

CROSS REFERENCE TO RELATED APPLICATIONS

The present application claims the benefit of U.S. provisional application Ser. No. 60/986,835 filed Nov. 9, 2007 to NORTON et al, entitled "A System and Method for Rule-Based Content Filtering", the contents of which are incorporated herein by reference.

FIELD OF THE INVENTION

The present invention relates to multimedia messaging services and, in particular, to a method and system for content filtering.

BACKGROUND OF THE INVENTION

Emerging versatile telecommunications services enable communications devices to exchange data containers each having multiple components of different types. For example, a component may include data representing a text, an image, an audio signal, or a video signal. Sophisticated terminal devices for handling such services are evolving rapidly leading to multiple "generations" of terminal devices separated by a relatively short time.

With co-existence of multi-generation terminal devices, incompatibility issues arise. A terminal device transmitting a data container would generally be unaware of the characteristics and capability of the receiving terminal device (or receiving terminal devices in the case of multi-cast communications). This requires that a facility be provided to ensure proper detection of the content of the data container in its entirety or proper detection of specific components thereof, and to notify a recipient terminal device of any changes made to the original container, as described in co-pending U.S. application of Ser. No. 12/238,390, filed on Sep. 25, 2008, the contents of which are incorporated herein by reference.

In addition to the compatibility issue, communicating multiple components each optionally having respective attachments further increases exposure to malicious insertions, such as viruses. The exposure of containers to intrusion necessitate that a content-filtering facility be provided.

There is a need, therefore to provide a facility for content filtering, in addition to content adaptation, in a network providing versatile services.

SUMMARY OF THE INVENTION

It is an object of the present invention to provide a content-filtering facility in a network offering multimedia services. It is another object to incorporate the content-filtering facility with an existing content-adaptation facility in order to realize a comprehensive, efficient, and economical system.

According to one aspect of the invention, there is provided an engine for editing content of containers, the engine comprising:
    a network interface for receiving said containers from clients and directing each container to a respective controller from among a plurality of controllers for identifying and parsing said containers;
    a memory device for storing:
        an array of Boolean variables, each said Boolean variable determined according to a respective operator applicable to a first operand characterizing said content and a second operand specifying a target value of said first operand; and
        an array of encoded rules, each rule specifying a respective content-editing action activated by a value of a respective Boolean expression of a respective subset of said Boolean variables;
    and
    a plurality of processors hosting transcoders, each transcoder for applying at least one of said encoded rules to a subset of said containers.

The engine further comprises:
    an operation manager comprising computer readable instructions stored in a computer readable storage medium for performing operation, administration, and maintenance functions;
    a graphical user interface, comprising computer readable instructions stored in a computer readable storage medium, coupled to said operation manager for entering said array of encoded rules and for assigning to each controller a respective subset of said transcoders; and
    a configuration memory device for storing identifiers of transcoders assigned to each controller.

The engine further comprises a sorting module, comprising computer readable instructions stored in a computer readable storage medium, coupled to said network interface, for sorting containers into container types, each container type corresponding to a protocol according to which a container is formulated, and directing containers of a specific type to a specific controller from among said plurality of controllers.

The engine further comprises a controller-load-balancing module, comprising computer readable instructions stored in a computer readable storage medium, coupled to said operation manager, said controller-load-balancing module comprising means for dynamic assignment of transcoders to controllers according to a time-varying flow rate of said containers.

The engine further comprises a transcoder-load-balancing module coupled to said each controller for equitably assigning container editing requests among transcoders assigned to said each controller.

The engine further comprises a blade server hosting said each controller and said respective subset of said transcoders, said blade server comprising:
    a processor having multiple cores, each core exclusively assigned to a transcoder of said subset of transcoders;
    a plurality of memory devices;
    an input interface; and
    an output interface.

The engine further comprises:
    a transcoder-service module coupled to each transcoder of said plurality of transcoders for receiving new programs from external sources;
    a program storage medium for storing a plurality of programs accessible to said each transcoder; and
    a program registry, comprising computer readable instructions stored in a computer readable storage medium, for identifying a function of each new program and organizing programs according to respective functions.

In the engine described above, the transcoder-service module further comprises computer readable instructions stored in a computer readable storage medium, which, when executed, cause a core of said processor to:
    receive a specific container and an editing request from a specific controller from said plurality of controllers;
    select and execute programs relevant to said editing request; and
    return a result to said specific controller.

The program registry comprises computer readable instructions which, when executed, causes a core of said processor to:
organize programs according to respective functions; and
replace existing programs with respective new programs.

In the engine described above, the program storage medium comprises:
resident programs stored in the computer readable storage medium; and
dynamically loaded external programs stored in the computer readable storage medium.

According to another aspect of the invention, there is provided a method of filtering a data container having multiple components, comprising:
selecting a component;
determining a plurality of binary conditions characterizing content of said component;
formulating a set of Boolean expressions, each comprising a Boolean operator and at least two operands selected from said set of binary conditions;
executing each Boolean expression of said set of Boolean expressions to determine a set of content indicators, said indicators having a one-to-one correspondence to said Boolean expressions; and
performing an editorial function relevant to said content corresponding to each of said indicators.

The method further comprises performing a further editorial function based on a single binary condition.

The method further comprises arranging said Boolean expressions in an order according to which an indicator resulting from executing a Boolean expression conditionally precludes execution of at least one subsequent Boolean expression.

The method as described above further comprises determining said Boolean expressions according to:
specified descriptors of said content; and
preset criteria corresponding to said descriptors.

In the method described above, the step of performing the editorial function comprises one of:
scanning said content to detect malicious insertions and removal of detected malicious insertions; and
scanning said content to detect malicious insertions and deletion of said content upon detecting malicious insertions.

According to yet another aspect of the invention, there is provided a method of editing content of a data container using a computing device, comprising:
formulating a set of descriptors of said content;
specifying a set of criteria corresponding to said descriptors;
specifying a set of operators;
defining a set of Boolean variables, each Boolean variable being an outcome of applying an operator from among said set of operators to a first operand and a second operand, where said first operand is a descriptor selected from among said set of descriptors, and said second operand is a criterion selected from among said set of criteria; and
defining a set of rules, each rule executing a Boolean expression, selected from among a set of Boolean expressions, of a subset of said Boolean variables and performing an action, selected from among a set of actions relevant to said content, according to an outcome of said executing.

In the method described above, the set of descriptors comprises at least one of the following: a size of said content; a content family from among a set of predefined content families; an encoding method; and a priority designation.

In the method described above, the set of operators comprises one or more of the following: unary operators; binary operators; arithmetic operators; comparison operators; logical operators; set operators; and user-defined operators.

The method further comprises entering said set of descriptors, said set of criteria, said set of operators, and said set of Boolean expressions through a graphical user interface comprising computer readable instructions stored in a memory of said computing device.

Conveniently, the method further comprises selecting said content to include a portion of said data container.

In accordance with another aspect of the invention, there is provided a system for filtering content of multimedia data containers, comprising:
a network interface for receiving said multimedia data containers from a network; and
a plurality of server units, each server unit comprising a set of processors and a set of memory devices, having installed thereon:
a filter-definition module, having computer readable instructions stored in a computer readable storage medium, for acquisition of definitions of a set of filters from a user, each filter specifying a definition of a content descriptor, a descriptor criterion, and an operator;
a rule-construction module, having computer readable instructions stored in a computer readable storage medium, for acquisition of a set of content-filtering rules from said user, each rule specifying a Boolean expression of a subset of said filters and a filtering action;
a module for characterizing content of each component of a multimedia data container, determining said content descriptor, applying said operator, and determining a state of said each filter;
a module for determining a binary output of each said rule; and
a module for performing a filtering action relevant to said content subject to a preset value of said binary output.

The system further comprises at least one of the following modules, each module comprising computer readable instructions stored in a computer readable storage medium:
(1) a module for configuring a server unit to accept multimedia data containers formed according to any protocol selected from a set of known protocols;
(2) a module for equitably distributing multimedia data containers among identically-configured server units;
(3) a module for enabling the user to provide the Boolean expression according to algebraic syntax;
(4) a module for enabling the user to provide the Boolean expression in the form of a tree structure;
(5) a module for enabling the user to enter the Boolean expression by editing and pruning a drawing of a tree, each node of the tree representing an operator and a respective set of operands;
(6) a module for validating correctness of the Boolean expression;
(7) a module for arranging the rules in an order according to which a specific filtering action performed by a rule precludes execution of at least one subsequent rule;
(8) a module for prompting the user to specify a successive rule of at least one of the rules conditional on a value of the Boolean expression;
(9) a module for presenting the set of content-filtering rules in the form of a formal graph; and
(10) a module for optimizing the Boolean expression of each rule.

The system further comprises a module, comprising computer readable instructions stored in a computer readable storage medium, for performing the following: selecting specific rules each specifying a subset of filters comprising at most a preset number of filters; evaluating, for each of the specific rules, the Boolean expression of a subset of filters for all values of the subset of filters to produce an array of $2^{\square}$ bits, $\square>1$ being a number of filters in the subset of filters; and storing the array of bits in a memory device.

In accordance with another aspect, the present invention provides a method of filtering content of a data container. The method comprises specifying a set of binary conditions, specifying a set of operators, forming a leaf vector, and forming a node vector.

The set of binary conditions characterize the content. One of the operators is designated a null successor, while each other operator is designated a successor from within the set of operators. The leaf vector comprises N>1 leaf records. Each leaf record has a leaf operator from among the set of operators and a respective subset of the binary conditions. The node vector has N node records, each having a node-operator field and a node-state field.

Each leaf operator is applied to respective binary conditions and a result is placed in the node-state field of a node record. A successor of each leaf operator is then placed in the node-operator field of the node record.

After processing each leaf record, the node vector is processed. Node records having a common operator are identified and replaced by a combined record. The common operator is applied to entries of the node-state fields of the identified node records and the resulting state is placed in the node-state field of the combined record. A successor of the common operator is placed in the node-operator field of the combined record.

A content index is determined as the resulting state of applying a common operator subject to the condition that the successor of the common operator is a null successor. Alternatively, the method may keep track of the number of node records of the node vector after combining node records of a common operator, and the content index is determined as the resulting state corresponding to a number of node records equal to one. The method further comprises a step of performing a specified editing action according to a value of the content index.

In accordance with a further aspect, the invention provides a method of filtering content of a data container based on predetermining a decision vector. The method comprises defining a set of binary conditions where each binary condition is a function of a selected descriptor of the content and a respective criterion of the descriptor; defining a set of Boolean expressions and corresponding content-filtering actions; selecting a Boolean expression of specified $\mu$ binary conditions represented as a string of $\mu$ bits, $\mu>1$; and evaluating the Boolean expression for each of $2^\mu$ values of the string to produce a decision vector of $2^\mu$ entries, each entry being a state of a content metric corresponding to one of the $2^\mu$ values of the string;

Upon receiving a data container, values of the specified $\mu$ binary conditions are determined according to content of the data container. The value of the resulting string of $\mu$ bits is then used to index the decision vector to acquire a value of the Boolean expression which determines whether a content-filtering action need be applied.

The Boolean expression may be acquired in an algebraic format having Boolean operators, operands, and delimiters. The Boolean expression is then evaluated by examining the Boolean expression to identify a simple pattern, the simple pattern enclosing a Boolean operator and two operands between two delimiters. Provided a simple pattern is found, the Boolean operator is applied to the two operands to determine a binary value of the pattern and the simple pattern, together with the two delimiters, is replaced with the binary value. The process of examining the Boolean expression to detect a simple pattern is repeated until the Boolean expression is reduced to a single binary value ("true" or "false") which determines whether to apply an editing action or not.

Alternatively, the Boolean expression may be acquired in a form of a tree structure having a plurality of nodes. The Boolean expression is then evaluated successively evaluating the nodes. A tree template having a plurality of records is created. Each record corresponds to a respective node and has four fields for a first operand, a second operand, a current operator, and a successor record. Starting with a first record and proceeding sequentially towards a last record, an operator of a current record is applied to respective binary values determined from a current value of the string to produce a new binary value. If the current record is a last record, the new binary value is the value of the Boolean expression. If the current record is an intermediate record, the new binary value is placed in an operand field of the successor record.

BRIEF DESCRIPTION OF THE DRAWINGS

Embodiments of the invention will now be described, by way of example, with reference to the accompanying drawings, in which.

DETAILED DESCRIPTION OF THE EMBODIMENTS OF THE INVENTION

Terminology

Multi-Media Service (MMS): The term is used colloquially to refer to multi-content communication services where information contents of different forms such as text, audio signals, video signals, images, presentations, etc., are exchanged among terminals through a network. Encoded information transferred from one terminal to another is typically arranged in a single data stream with time-interleaved segments corresponding to the different information contents.

Container: A container is a computer file stored on a computer readable medium and transmitted over a computer network. The container is structured to contain various types of data. The container may support multiple text, audio, and video streams with synchronization information to enable coordinated play back of various streams.

Container component: A container includes sections, each comprising data encoded in a specific form, such as a text, audio data, image data, or video data. The term container component refers to data in one section. A container component may be referenced as a "component" for brevity. In a multimedia messaging system, a component is also known as "media".

Container screening: "Container screening" refers to a process of examining the content of a container, including all components, to ensure absence of any undesirable insertions, especially harmful insertions.

Container adaptation: "Container adaptation" refers to a process of modifying the form of a container component found to be incompatible with the decoding capability of a respective receiver. If it is not feasible to present a container component to suit a receiver, the container component may be deleted. A container-adaptation process is receiver specific while the process of container screening is independent of the type of intended receiver.

Container editing: The term "container editing" refers to the combined processes of container screening and container adaptation.

Container conditioning: The term may be used synonymously with "container editing". However, container conditioning also appends an appropriate notification with a container, even when a container is not modified.

Transcoder: A transcoder is a device, which performs direct digital-to-digital translation of encoded information to enable an information record of one format to be reproduced in a different format suitable for a specific receiver.

Figure 1:
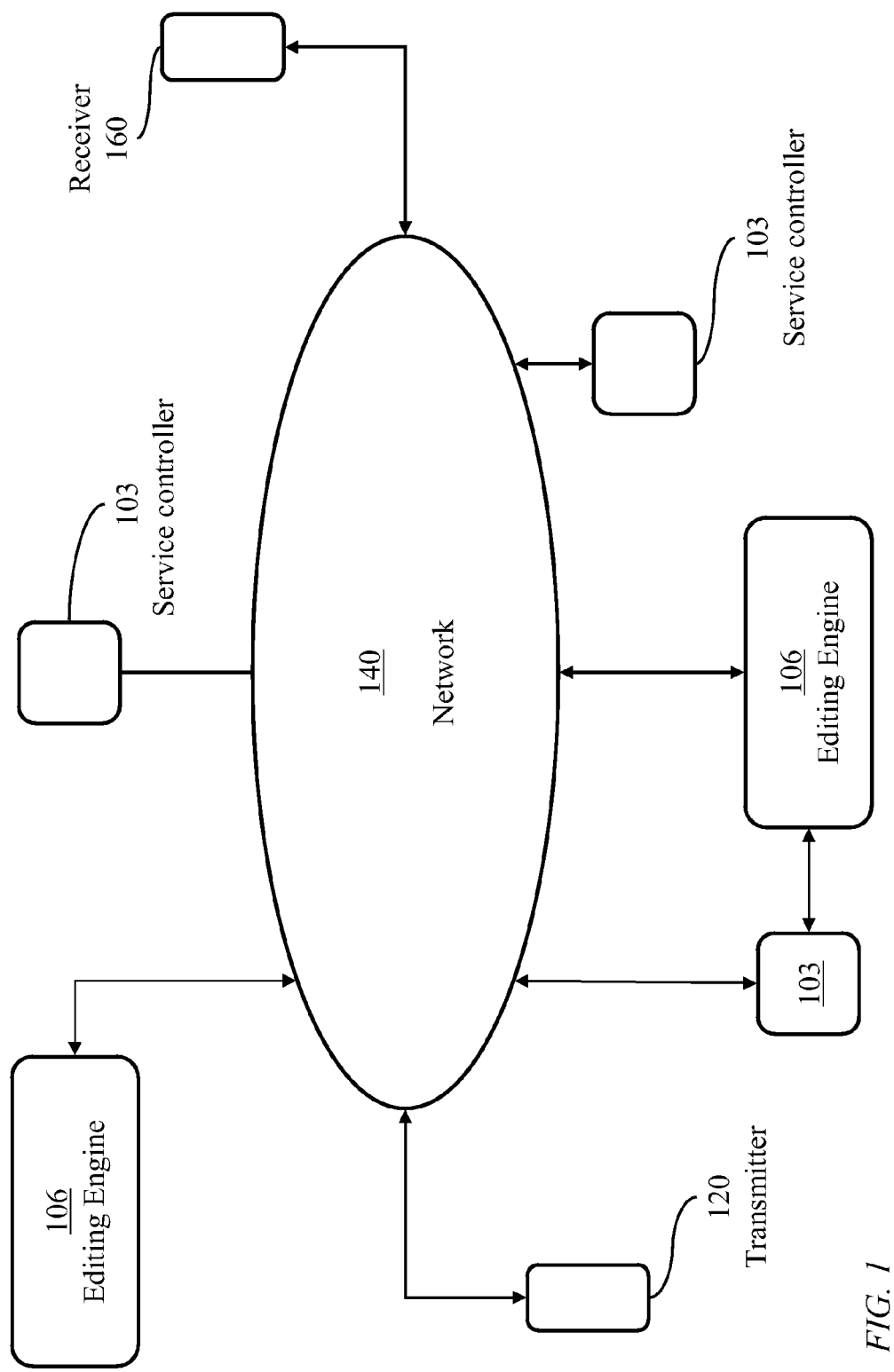
FIG. 1 illustrates a network supporting service controllers and editing engines for filtering and adapting data containers communicated through the network, in accordance with an embodiment of the present invention.

FIG. 1 illustrates a network 140 providing a path from a transmitting device 120 to a receiving device 160, hereinafter referenced as transmitter 120 and receiver 160. Network 140 supports service controllers 103 and editing engines 106, in addition to numerous other hardware terminal devices of different types. Transmitter 120 sends containers to receiver 160, where a container may include data of different content type such as encoded text, audio signals, still images, animation (rapid display of images), and video signals. A container may be directed to a service controller 103 which, in turn, directs the container to an editing engine 106 for examining the container and, where needed, editing the content of the container. An editing process includes data screening to ensure absence of any undesirable insertions, especially harmful insertions, content modifications to meet specific requirements, and content adaptation to be compatible with the decoding capability of a respective receiver.

Figure 2:
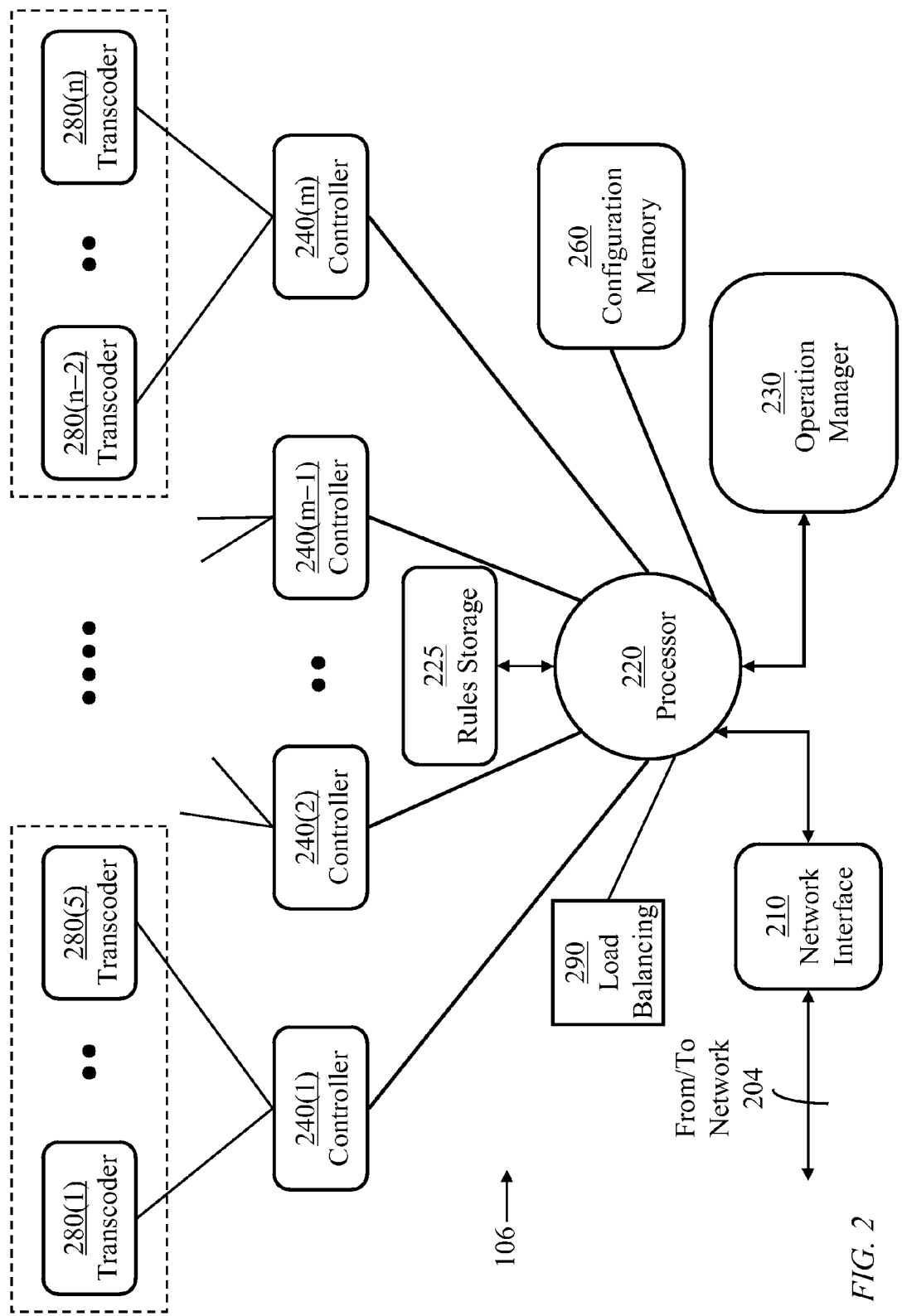
FIG. 2 illustrates an editing engine comprising controllers and transcoders, in accordance with an embodiment of the present invention.

FIG. 2 illustrates an editing engine 106. A network interface 210 receives containers from clients through a link 204. A container is directed to one of m>1 controllers 240, individually identified as 240(1), 240(2), ..., 240(m). Controllers 240 may be implemented as a distinct hardware entity or share a computing device hosting a number of transcoders 280 as will be described below. Controllers 240 are protocol specific, each being programmed to handle containers formed according to a respective protocol. Controllers handling a specific protocol are said to be of the same controller type. The controllers may be grouped into controller groups, each controller group handling containers formulated according to the same protocol. An editing engine 106 may have controllers of different types. However, an entire editing engine 106 may be configured to have controllers of the same type. The editing engine 106 may also have a load-balancing module 290.

The editing engine 106 includes a number of transcoders 280, individually identified as 280(1), 280(2), ..., 280(n). The primary function of the transcoders 280 is to perform direct digital-to-digital translation of encoded information to enable an information record of one format to be reproduced in a different format suitable for a specific receiver. A transcoder, however, may also perform processes of content filtering together with content adaptation. A number of selected transcoders 280 is assigned to each controller 240, together forming a control assembly. For example, in FIG. 2, controller 240(1) and transcoders 280(1) to 280(5) form one control assembly installed on a respective computing device. Controller 240(m) and transcoders 280(n−2) to 280(n) form another control assembly installed on another computing device. A control assembly is preferably installed on a server unit, also called a "blade server", which is a single circuit board supporting processors and memory devices.

A processor 220 hosts a network interface 210 and an operation manager 230. Network interface 210 receives containers from clients communicatively coupled to network 140 (FIG. 1). An operation manager 230 comprises computer readable instructions stored in a computer readable storage medium for performing operation, administration, and maintenance functions.

A service controller 103 may receive containers and send container editing requests to one of the editing engines 106.

Processor 220 also hosts a graphical user interface (not illustrated), which comprises computer readable instructions stored in a computer readable storage medium, coupled to operation manager 230, for entering an array of encoded rules and for assigning to each controller 240 a respective subset of transcoders. Configuration memory device 260 stores identifiers of transcoders assigned to each controller.

The rules governing the content filtering process may be stored as a common rule file stored in a rules memory 225 which is accessed by each transcoder 280. Alternatively, each computing device (server unit) hosting a controller and associated transcoders may store a relevant subset of the rules file.

Figure 3:
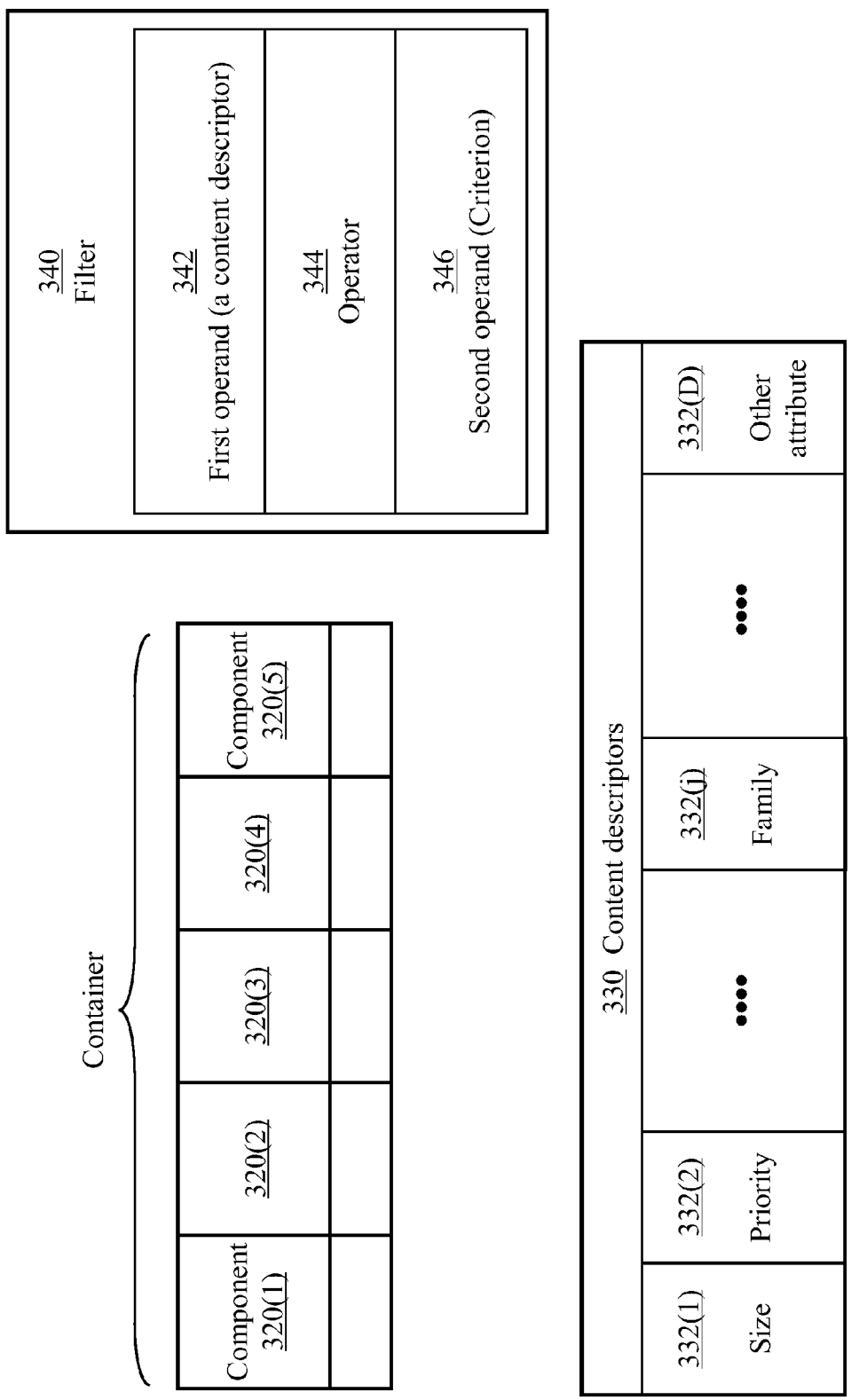
FIG. 3 illustrates exemplary structures of a multimedia container, content descriptors of a container component, and a content filter, in accordance with an embodiment of the present invention.

FIG. 3 illustrates a container having multiple components 320, individually identified as 320(1), 320(2), etc. A component 320 may contain a text, an audio recording, an encoded image, a video recording, and any of other content types. The content of a component is characterized using a set 330 of descriptors 332 individually identified as 332(1), 332(2), . . . 332(j), and 332 (D), D being a total number of descriptors. Content descriptors are defined according to several attributes such as content type, identifier (name), extension, digital signature, cryptographic functions, priority, and file size. Descriptors may be added or deleted as content-filtering requirements vary with the evolving art of multimedia telecommunications.

In accordance with an embodiment of the present invention, characteristics of the content of a container component are represented as a set of binary variables, each binary variable determining whether the content meets a specific criterion. The value of a content descriptor of a received container is determined by examining the content of the container. A transcoder performing this function is therefore aware of the format of the received container and implications of a protocol according to which the container is formulated. The value of a characterizing binary variable is determined by applying an operator 344 to two operands; a value of the content descriptor (342) and a corresponding criterion 346 entered by an installer (a user) of the content-filtering system. The operator 344 and the two operands 342 and 346 are said to form a filter 340 (also called a content-condition or simply a condition). Thus, the content of a container component is characterized by a set of filters, each having a value of "true" or "false".

Editing a container before adaptation to suit a receiver is based on a set of rules, each rule determining an editing action such as deleting the entire content, deleting malicious insertions found in the content, or removing an attachment of the content. A rule is a function of a respective subset of the filters. Having selected the filters to be binary variables, the function defining a rule is preferably formulated as a Boolean expression of the subset of filters. Thus, an installer (a user) of a system for content filtering (as will be described in more detail with regard to FIG. 7 and FIG. 8) defines a rule by a subset of filters, a Boolean expression, and an action to be performed according to an outcome executing the Boolean expression.

Figure 4:
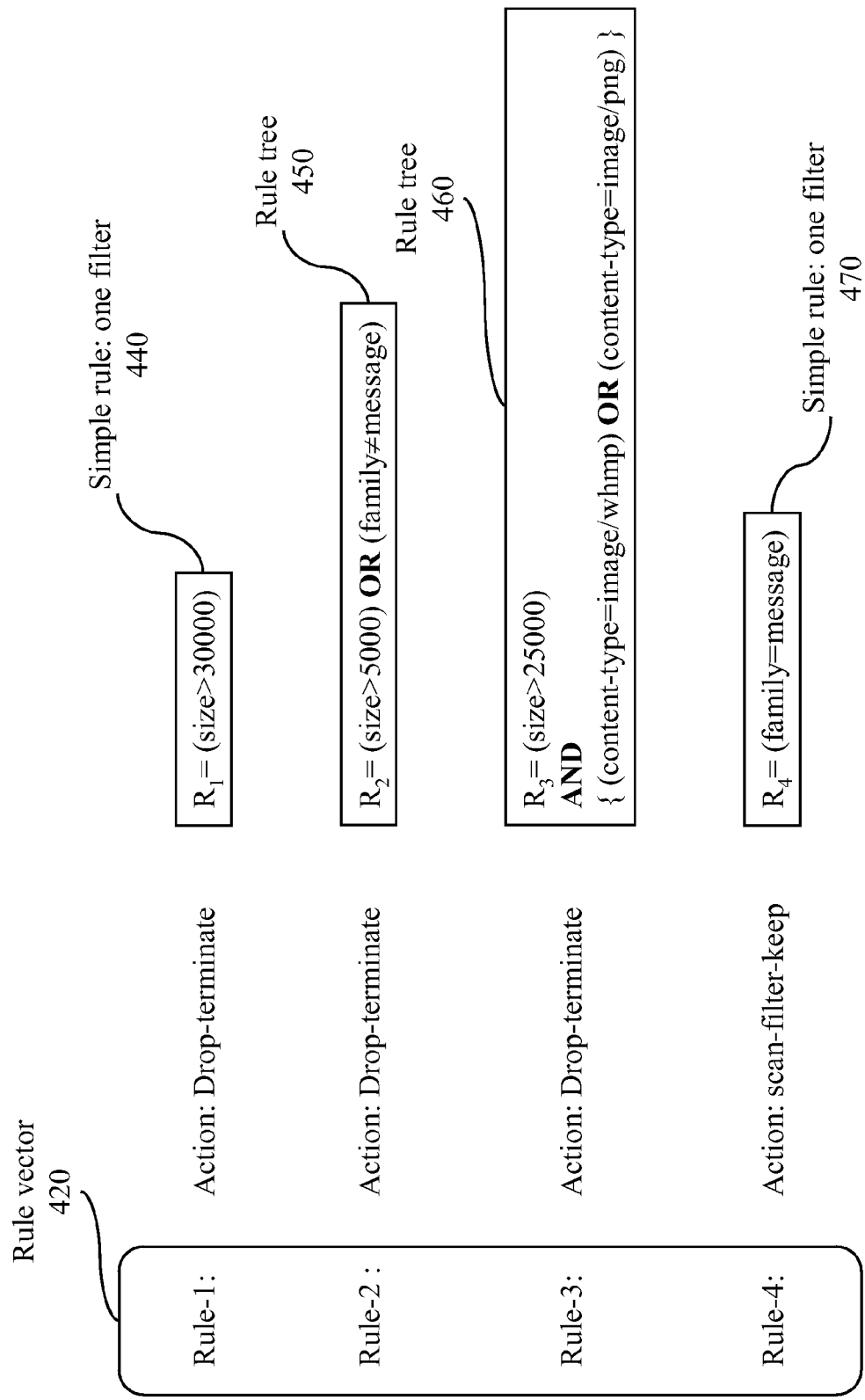
FIG. 4 illustrates algebraic forms of Boolean expressions associated with a set of rules applicable to a data container, in accordance with an embodiment of the present invention.

FIG. 4 illustrates algebraic forms of Boolean expressions associated with a set of four rules, stored in a rule vector 420, applicable to a component of a data container. The same set of rules may also be applied to at least one other component of the rule filter.

A first rule, Rule-1, is defined by a single filter (size>30000), where the content descriptor is the size of the component, the operator is "GREATER THAN" and the criterion is 30000 (reference numeral 440). The respective action, if the rule result is Boolean "true" is to drop the component and terminate processing of the remaining rules for the component under consideration.

A second rule, Rule-2, is defined by a Boolean expression 450 of two filters (size>5000) and (family≠message). The descriptor of the first filter is "size", the criterion is "5000", and the operator is "GREATER THAN". The descriptor of the second filter is "family", the criterion is "message", and the operator is "NOT EQUAL". The Boolean expression contains a single operator "OR". The action associated with Rule-2 is the same as that of Rule-1.

A third rule, Rule-3, is defined by a Boolean expression 460 of three filters: (size>25000), (content-type=image/wbmp), and (content-type=image/png). The descriptor of the first filter is "size", the criterion is "25000", and the operator is "GREATER THAN". The descriptor of the second filter is "content-type", the criterion is "image/wbmp", and the operator is "EQUAL". The descriptor of the third filter is "content-type", the criterion is "image/png", and the operator is "EQUAL". The Boolean expression contains two operators "AND" and "OR". The action of Rule-3 is the same as the action of Rule-1. It is noted that "wbmp" refers to Wireless Bitmap (Wireless Application Protocol, WAP, graphic format), and "png" refers to "Portable Network Graphics".

A fourth Rule, Rule-4 is defined by a single filter (family=message), where the content of the descriptor is "family", the criterion is "message", and the operator is "EQUAL" (reference numeral 470).

Figure 5:
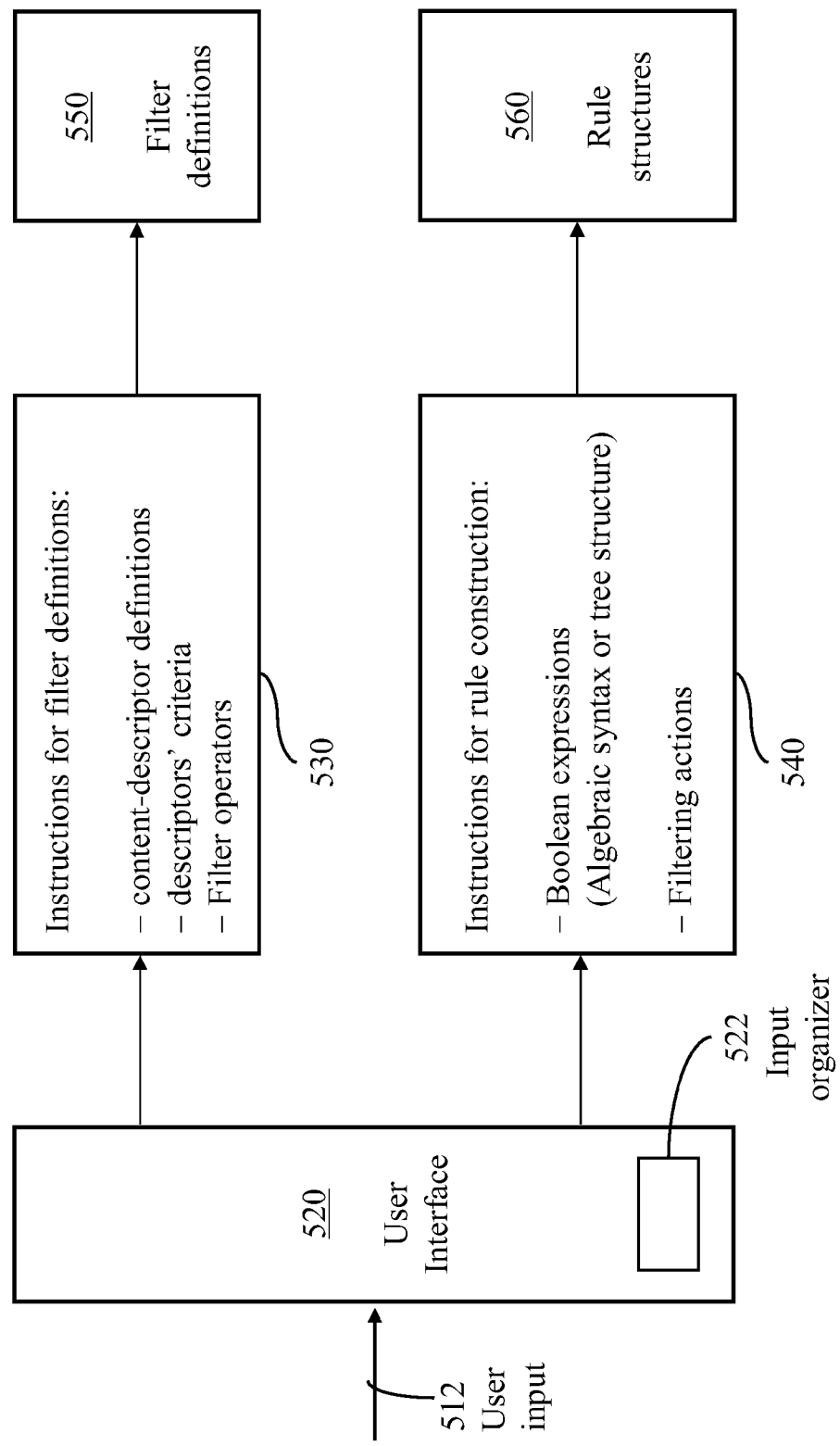
FIG. 5 illustrates basic components of a content-filtering process, in accordance with an embodiment of the present invention.

FIG. 5 illustrates the basic components of a data acquisition sub-system incorporated in operation manager 230 of FIG. 2 and comprising a user interface 520, a filter-creating module 530 for acquiring filter definitions, a rule-construction module 540 for acquiring rule definitions, a memory division 550 for storing filter definitions, and a memory division 560 for storing rule definitions (rule structures). The user interface 520 enables an installer (a user) to provide input data 512 to define a set of filters and a set of rules. The filter-creation module 530 comprises computer readable instructions stored in a computer readable storage medium, which, when executed, cause a processor to prompt the installer to enter content-descriptor definitions, a criterion for each definition, and an operator. The values of the descriptors are determined according to the content of a received container.

The rule-construction module 540 contains computer-readable instructions stored in a computer readable storage medium, which, when executed, cause a processor to prompt the installer to enter a Boolean expression for each rule, and select an action from a set of predefined actions. The computer-readable instructions also cause the processor to parse the Boolean expression and determine a sequence of executing terms of the expression.

The filter definitions are stored in a memory division 550 of a memory device, and the rule definitions are stored in a memory division 560 of the same memory device, or of any other memory device.

Figure 6:
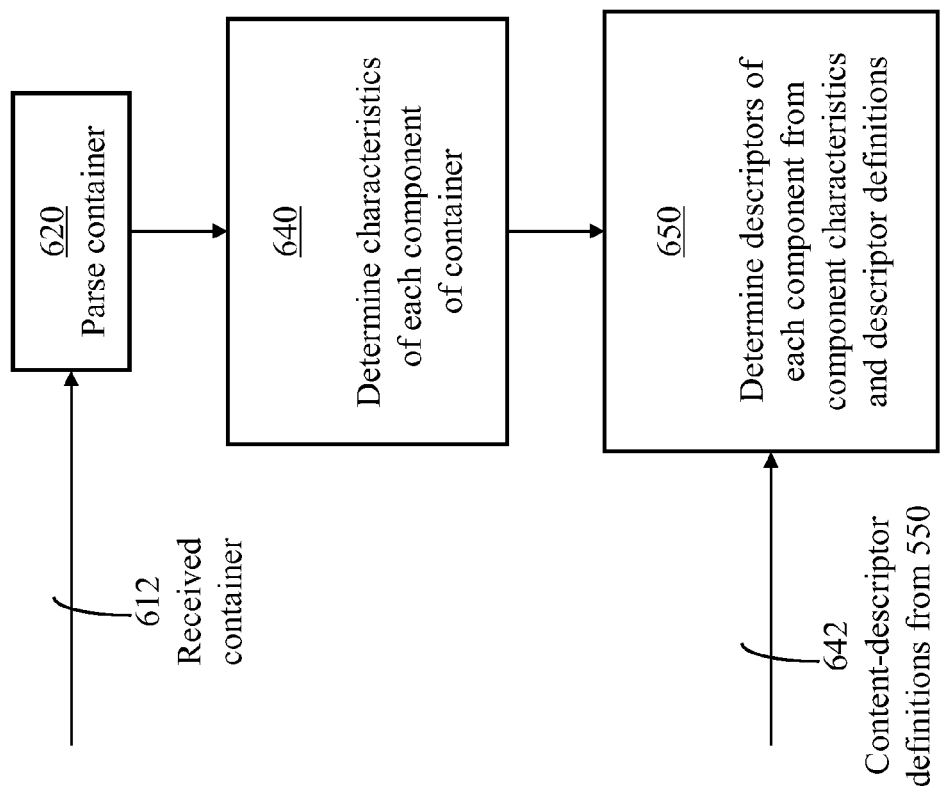
FIG. 6 illustrates a process of deriving descriptors of container content, in accordance with an embodiment of the present invention.

FIG. 6 illustrates a process of determining values of content descriptors of a received container 612 using definitions of the content descriptors stored in memory division 550. The received container 612 is parsed in step 620 to identify the components of the container. Each component is analyzed in step 640 and in step 650 the results are paired with content-descriptor definitions read from memory division 550.

Figure 7:
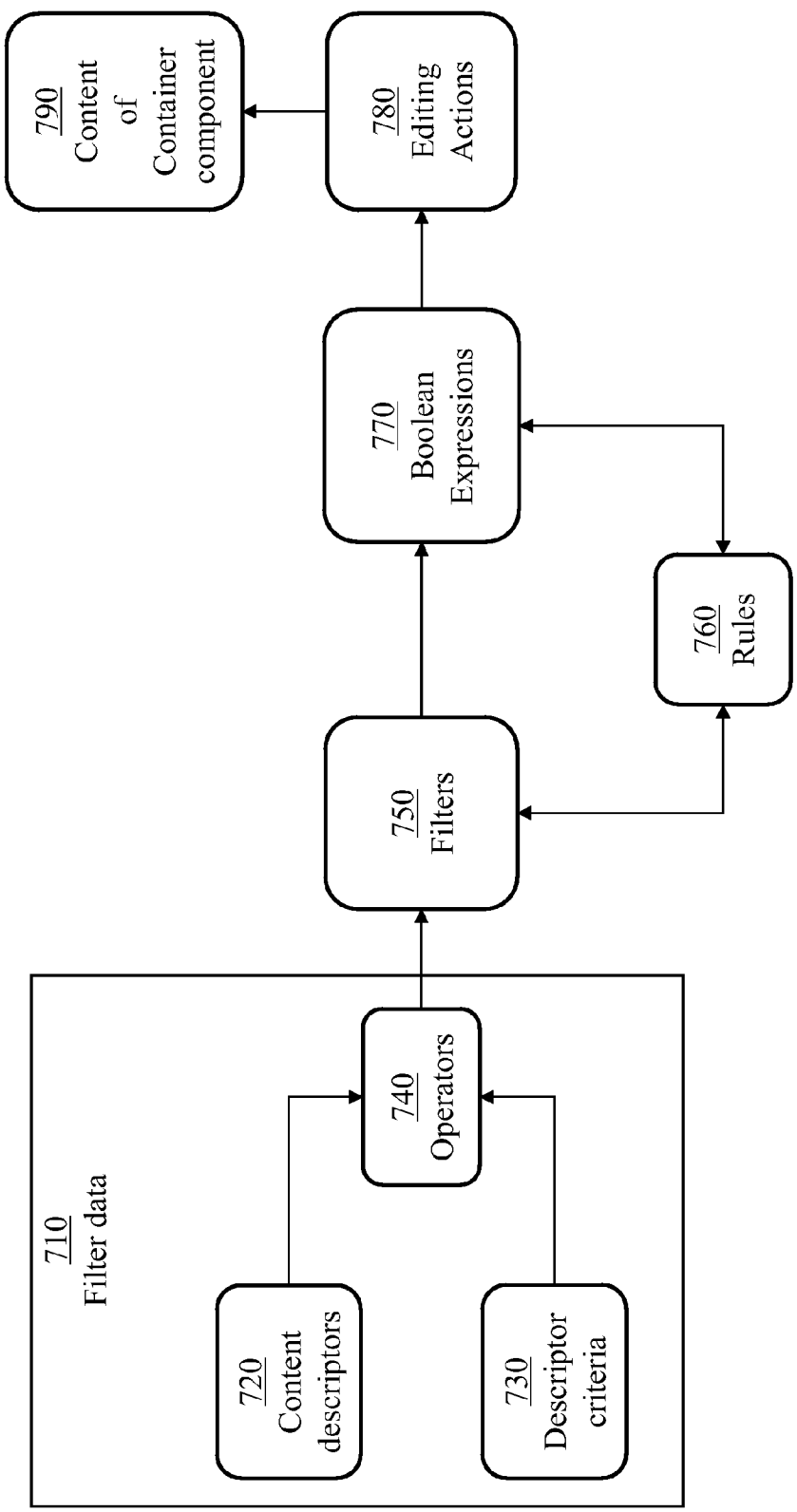
FIG. 7 illustrates a system for content filtering, in accordance with an embodiment of the present invention.

FIG. 7 illustrates the overall organization of a system for content filtering in accordance with an embodiment of the present invention. A memory 710 stores data for all relevant filters. Each filter is defined by an operator from a set of operators 740 determined by module 530 of FIG. 5, a content descriptor from a set of content descriptors 720 are determined in step 650 of FIG. 6, and a descriptor criterion from a set of descriptor criteria 730 determined in module 530 of FIG. 5. The binary value of each filter ("true" or "false") is stored in a memory device 750 for use in executing a set of rules defined in module 540 of FIG. 5.

Each rule is defined by a subset of filters, a Boolean expression, and an action. A memory 770 stores encoded Boolean expressions determined in module 540 of FIG. 5 according to system installer (user) input. A memory 760 stores identifiers of filters used in each rule and respective Boolean expressions. A memory 780 stores indications of editing actions to be performed subject to respective results of evaluating the Boolean expressions. The execution of each Boolean expression yields a binary result and a respective editing action. Upon completion of an editing action, the edited content is placed in a memory 790.

Figure 8:
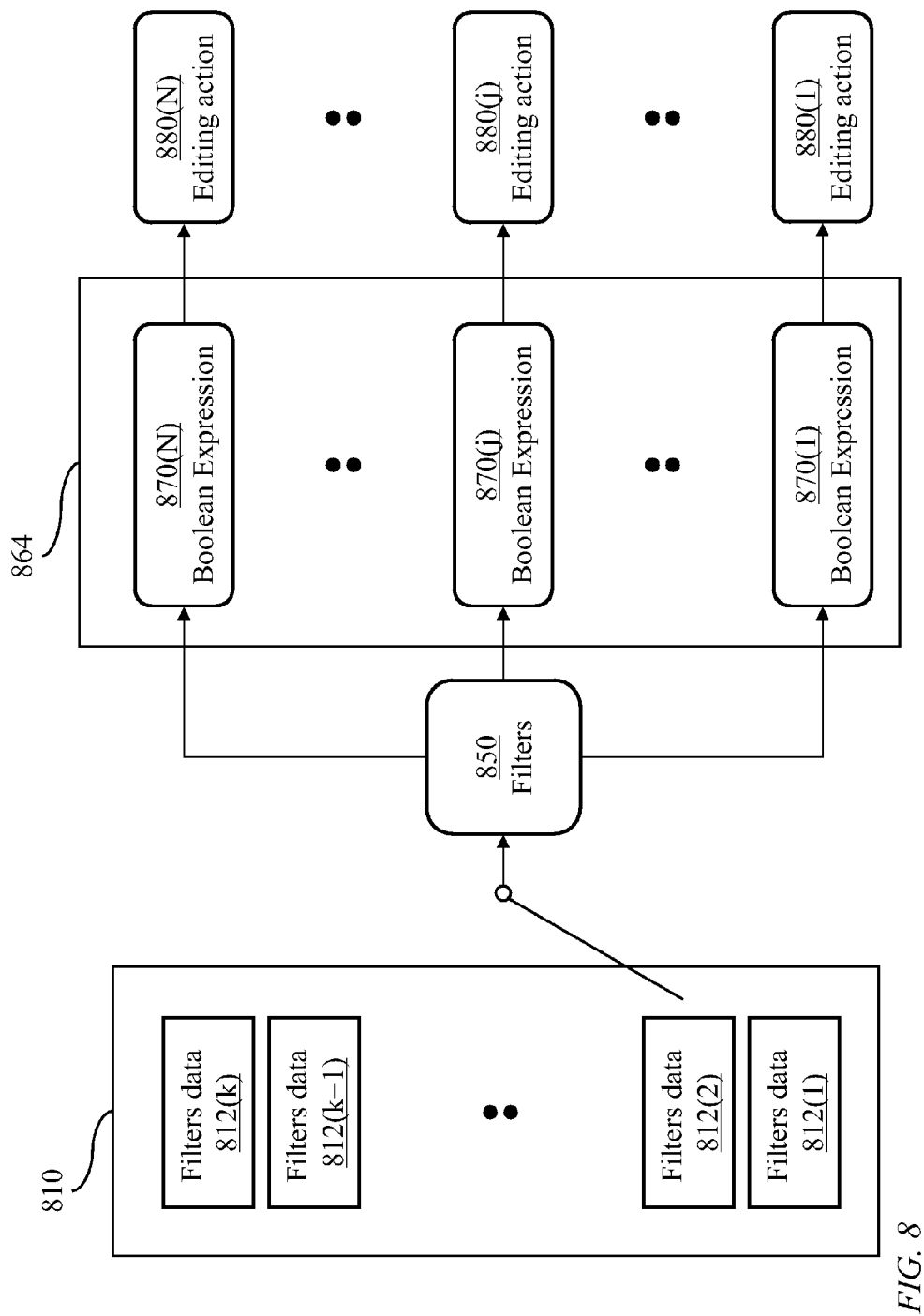
FIG. 8 illustrates a system similar to the system of FIG. 7 adapted for containers having multiple components, in accordance with an embodiment of the present invention.

While FIG. 7 illustrates the system for content filtering, according to an embodiment of the invention, as applied to a single component, FIG. 8 illustrates the system for content filtering of FIG. 7 as applied to k>1 container components. A memory device 810 stores data of all relevant filters of each of the k container components. The data pertinent to each filter is individually identified as 812(1) to 812(k). The components of the container are processed sequentially. The results of applying the operator of each filter, for a component under considerations, are held in a memory 850. A set of N>1 encoded Boolean expressions is stored in a memory 864. The Boolean expressions are individually identified as 870(1) to 870(N), each associated with a respective editing action from N editing actions, individually identified as 880(1) to 880(N).

Figure 9:
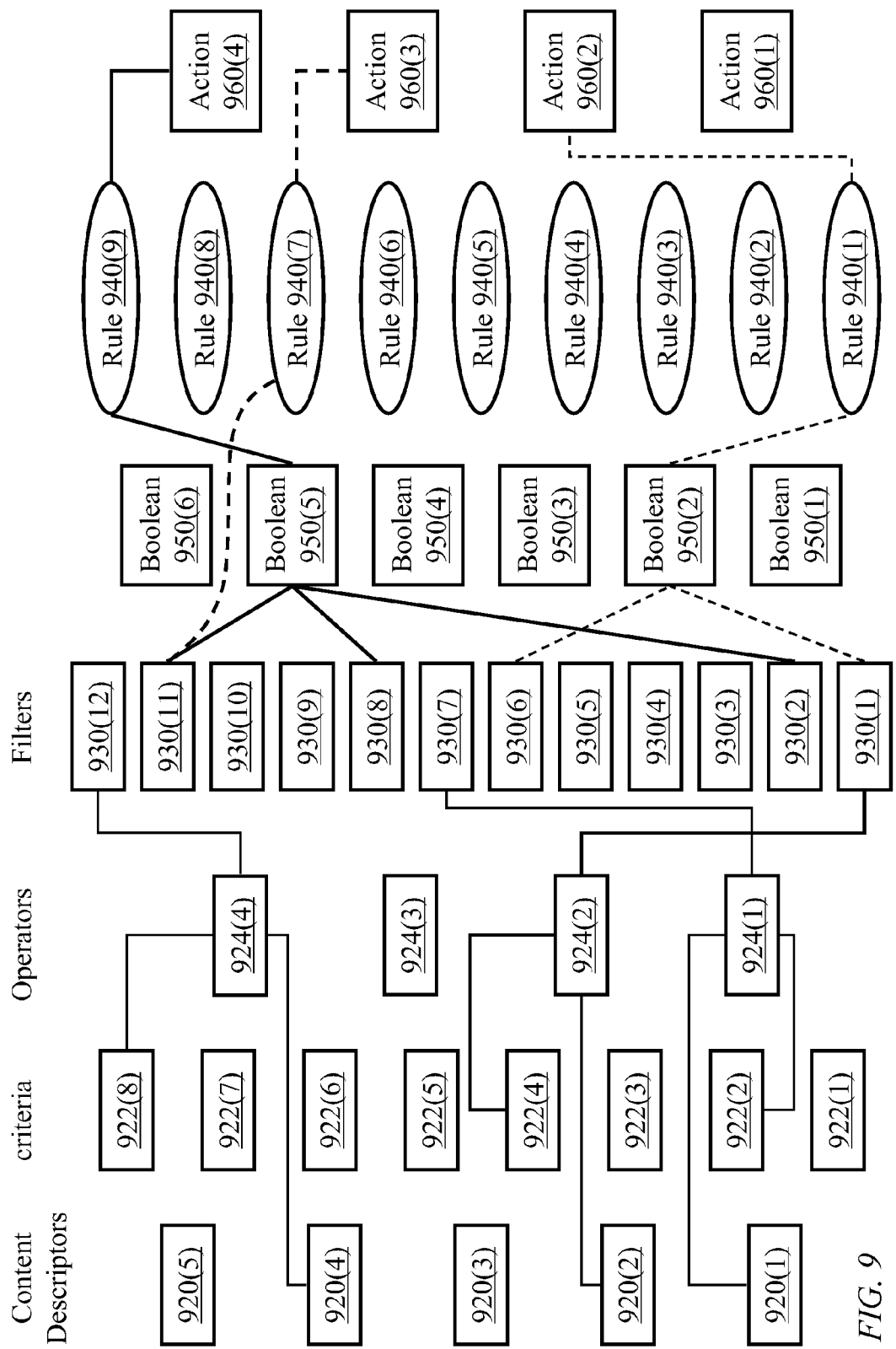
FIG. 9 details a content-filtering process, in accordance with an embodiment of the present invention.

FIG. 9 illustrates an exemplary process of content filtering. An installer (a user) of the system for content filtering of FIG. 7 or FIG. 8 has initially defined five content descriptors, individually identified as 920(1) to 920(5), eight descriptor criteria individually identified as 922(1) to 922(8), and four operators individually identified as 924(1) to 924(4). The installer has defined twelve filters, individually identified as 930(1) to 930(12), each filter specifying one of the content descriptors 920, one of the criteria 922, and one of the operators 924. Upon determining values of the five content descriptors 920(1) to 920(5), as described in step 650 of FIG. 6, the binary values of the twelve filters are determined.

The installer has defined six Boolean expressions, individually identified as 950(1) to 950(6), where each Boolean expression is associated with a subset of the 12 filters. For example, Boolean expression 950(2) is associated with two filters, 930(1) and 930(6), and Boolean expression 950(5) is associated with filters 930(2), 930(8), and 930(11). The installer defined four actions individually identified as 960(1) to 960(4). The installer then defined nine rules, individually identified as 940(1) to 940(9), using rule-construction module 540 of FIG. 5. Each rule is associated with a single Boolean expression 950 and a single action 960. For example, rule 940(1) specifies Boolean expression 950(2) and action 960(2), while rule 940(9) specifies Boolean expression 950(5) and action 960(4).

A rule may be based on a single filter, where the result of the rule is the binary value of the filter. For example, rule 940(7) depends solely on filter 930(11).

Boolean Expression Representation

An installer of the system for content filtering of FIG. 7 or FIG. 8 may provide a Boolean expression 950 according to conventional algebraic syntax or according to a tree structure. The user interface 520 of FIG. 5 comprises a first module (not illustrated) for encoding a Boolean expression presented in algebraic form and a second module (not illustrated) for encoding a Boolean expression presented as a tree structure. Each of the two modules provides a respective template to enable the installer to properly specify a Boolean expression.

A Boolean expression comprises simple operations, compound operations, and complex operations. A simple operation is exhibited as an operator and two operands with the operator and operands bounded by two delimiters (such as two brackets). The operator and operands may be listed in any order and the two delimiters need not be distinguished from each other. The two operators are Boolean variables representing two filters. A compound operation comprises an operator and two simple operations with the operator and two simple operations bounded by two delimiters. A complex operation comprises an operator and two operations all bounded by two delimiters where either of the two operations may be a simple operation or a compound operation. The two operations constituting a complex operation may also be complex operations. Delimiters of a simple operation, compound operation, or complex operation may be identical.

Figure 10:
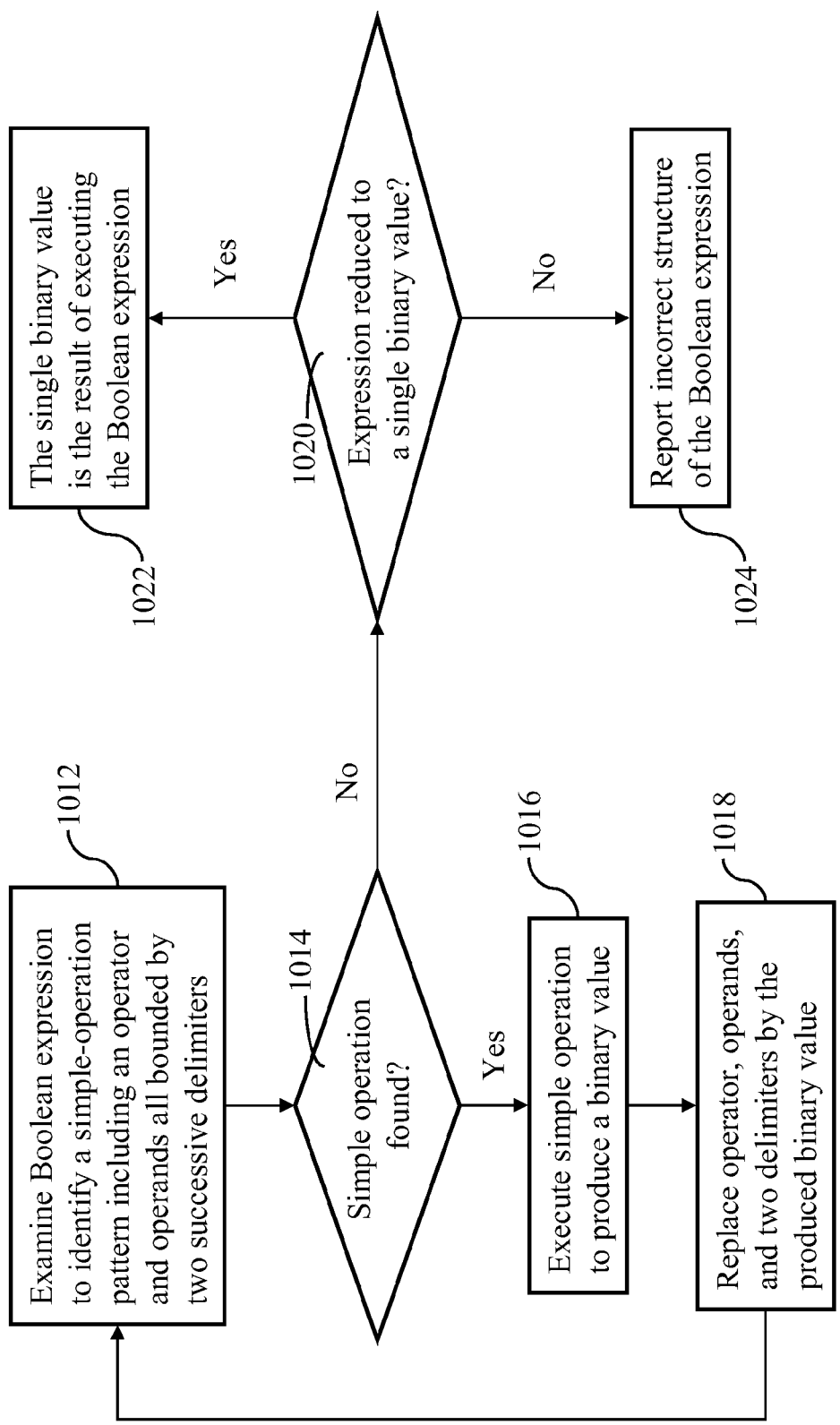
FIG. 10 illustrates a method of evaluating a Boolean expression of a rule, in accordance with an embodiment of the present invention.

FIG. 10 illustrates a method of evaluating the Boolean expressions, according to an embodiment of the present invention, which requires only recognizing and performing simple operations. According to the method, an encoded Boolean expression is parsed to identify simple operations. The operator of an identified simple expression is applied to the respective operands (filters) to produce a binary value of "true" or "false" (for example, represented as "1" and "0"). The operator, operand, and two delimiters of the identified simple operation, thus processed, are deleted and replaced by the result of the operation. The process continues recursively until the encoded Boolean expression reduces to a single simple operation, the result of which becoming the outcome of the Boolean expression.

In step 1012 of FIG. 10, a Boolean expression is examined to identify a simple operation. If a simple operation is found (step 1014), step 1016 executes the simple operation and produces a binary value. Step 1018 replaces the operator, operands, and delimiters of the simple operation by the binary value. Step 1012 is then revisited to look for another simple operation in the reduced Boolean structure. If step 1014 determines that no further simple operations are found in the current form of the Boolean expression, step 1020 examines the current form to determine if it has indeed reduced to a single binary value ("true", false" or "1", "0"). If so, step 1022 reports the single binary value as the result of executing the Boolean expression. If step 1020 determines that the processed Boolean expression contains more than a single binary value, step 1024 reports an indication that the Boolean expression has not been correctly formed.

The process of FIG. 10 is preferably performed during data entry so that the user (the installer) can correct the Boolean expression. The user interface 520 or some other component of the editing engine may be provided with computer instructions to analyze an erroneously formed Boolean expression and locate an error.

Figure 11:
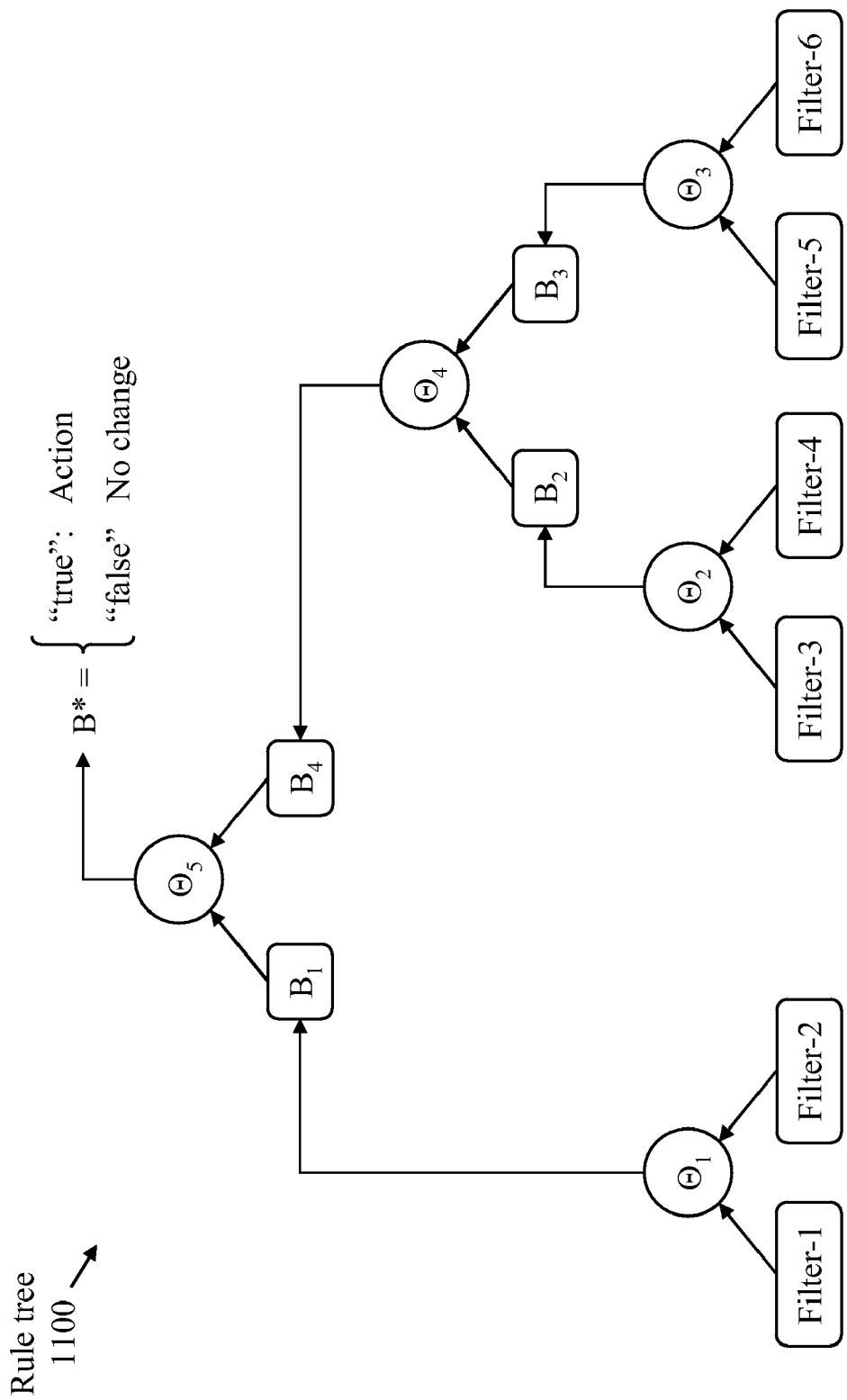
FIG. 11 illustrates a first exemplary rule-tree structure for encoding a filtering rule, in accordance with an embodiment of the present invention.

An alternative method of encoding and evaluation Boolean expressions, according to an embodiment of the present invention, relies on a graphical tree representation of a Boolean expression. An exemplary rule tree 1100 is illustrated in FIG. 11, which depicts a Boolean expression of six operands (six filters) identified as Filter-1 to Filter-6 each being a leaf of the tree. Three operators, denoted $\Theta_1$, $\Theta_2$, and $\Theta_3$, define three operations {Filter-1, $\Theta_1$, Filter-2}, {Filter-3, $\Theta_2$, Filter-4}, and {Filter-4, $\Theta_3$, Filter-6}. An immediate successor of each operator is defined. For example, the successors of $\Theta_1$, $\Theta_2$, and $\Theta_3$, are operators $\Theta_5$, $\Theta_4$, and $\Theta_4$, respectively, and the successors of operators $\Theta_4$ and $\Theta_5$ are $\Theta_5$ and "NULL", respectively. An operator having a "NULL" successor produces a result of the Boolean expression.

Operator $\Theta_1$ produces a binary output B1, which is an operand of operator $\Theta_5$. Operator $\Theta_2$ produces a binary output B2 which is an operand of $\Theta_4$. Operator $\Theta_3$ produces a binary output B3 which is another operand of operator $\Theta_4$. Operator $\Theta_4$ produces a binary output B4 which is another operand of operator $\Theta_5$. Operator $\Theta_5$, produces binary output B*, which is the result of the Boolean expression represented by the tree.

Figure 12:
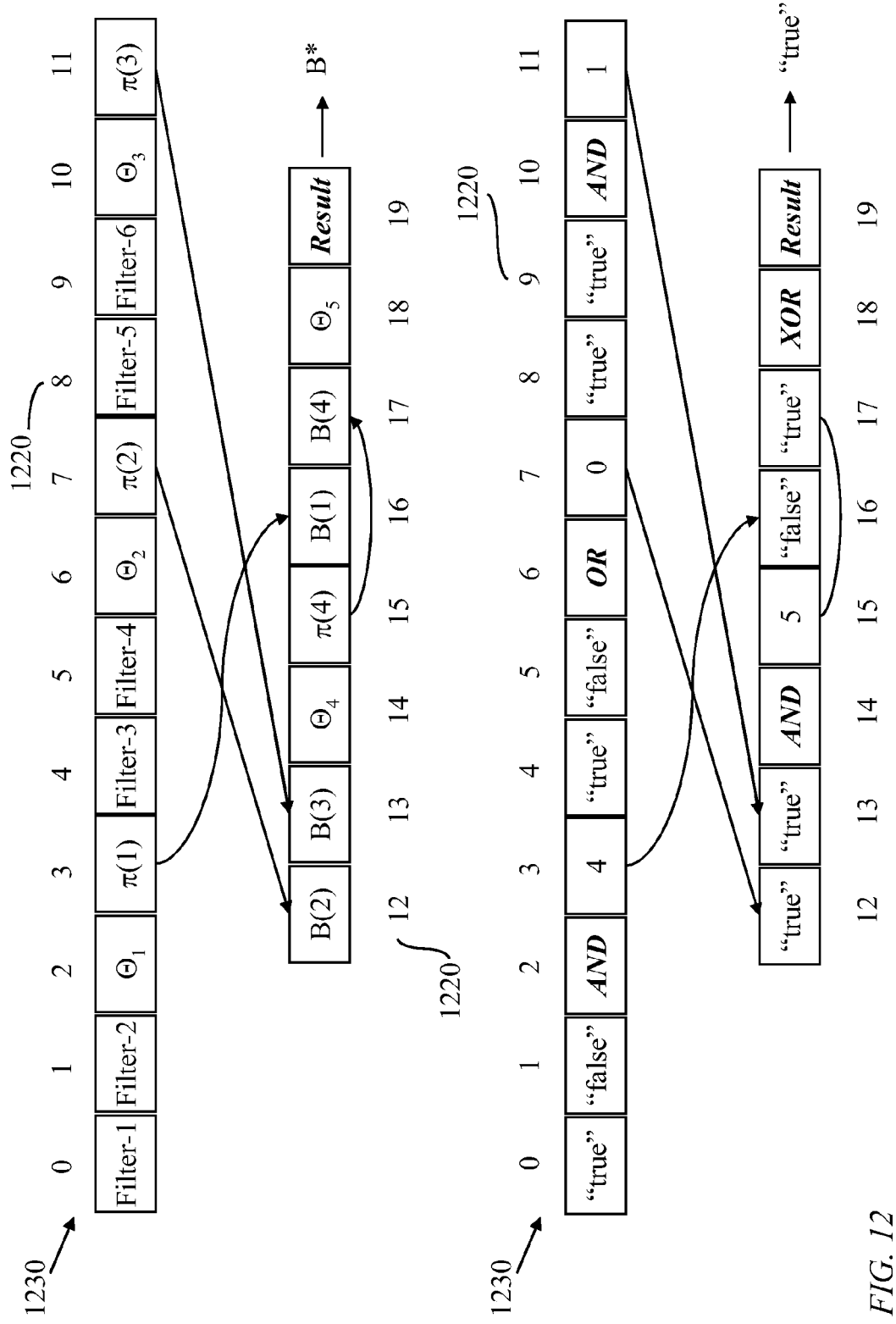
FIG. 12 illustrates a first data structure for encoding the rule-tree structure of FIG. 11.

FIG. 12 illustrates a template array 1230 for representing the rule tree 1100 of FIG. 11. An index 1220 of the template array 1230 varies from 0 to 19 as indicated in FIG. 12. The template array 1230 is divided into a number of records equal to the total number of operators (five in the exemplary tree of FIG. 11), each record corresponding to an operator and representing a simple operation having two operands. The binary values of filters are known after a container under consideration is processed. Thus, record includes indices of respective filters, an operator definition, and a pointer to another record corresponding to an immediately succeeding operator. A "NULL" pointer indicates that a current record is the last record to be processed. A user may enter the records in any order, and a module (not illustrated) within the user interface 520 of FIG. 5 reorganizes the records so that the records may be processed sequentially, and when any record is processed, the values of the respective operands would have been already determined.

As illustrated in FIG. 12, the first three records correspond to operators $\Theta_1$, $\Theta_2$, and $\Theta_3$ applicable to the six filters forming the leaves of the tree. Pointer $\pi(1)$ of the first record points to index 16 of the array which holds the binary result B(1) of operator $\Theta_1$. Pointer $\pi(2)$ of the second record points to index 12 of the array which holds the binary result B(2) of operator $\Theta_2$. Pointer $\pi(3)$ of the third record points to index 13 of the array which holds the binary result B(3) of operator $\Theta_3$. Thus, when the fourth record is reached, the two operands B(2) and B(3) would have already been computed. The binary result B(4) of operator $\Theta_4$ is written in location $\pi(4)$=17. Thus, when the fifth record is reached, the respective two operands B(1) and B(4) would be already known. The binary output of operator $\Theta_4$ is the result of the Boolean expression because operand $\Theta_4$ has no successor (i.e., a null successor).

An exemplary activation of the template array 1230 is also illustrated in FIG. 12. The values of Filter-1 to Filter-6, determined according to the process of FIG. 6 are "true", "false", "true", "false", "true", and "true", respectively. The Boolean operators $\Theta_1$ to $\Theta_5$ are specified by a user as "AND", "OR", "AND", "AND", and "XOR", respectively. Operator "XOR" produces a binary output "true" which is the result of the Boolean expression since operator $\Theta_4$ ("XOR"), has a null successor.

Figure 13:
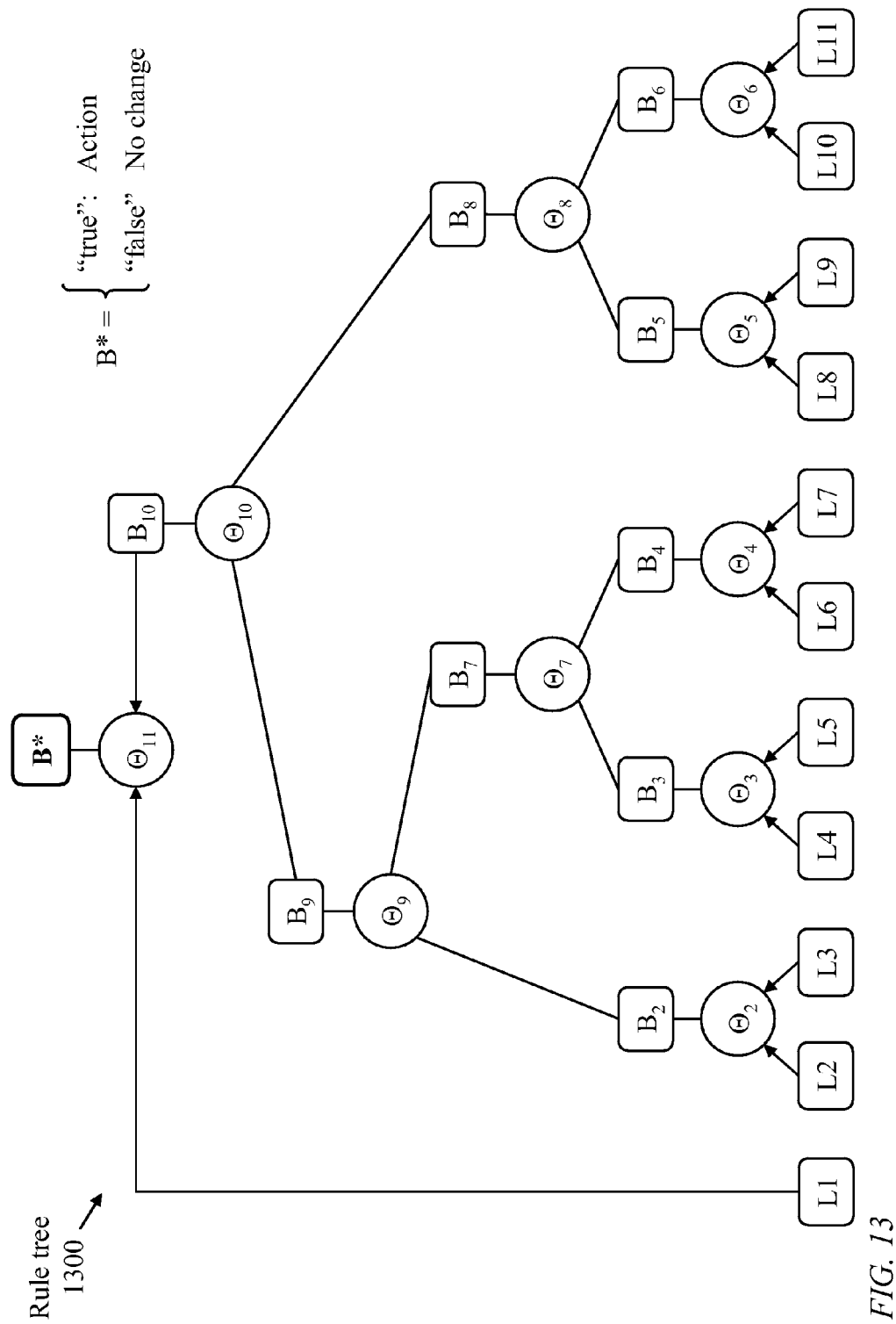
FIG. 13 illustrates a second exemplary rule-tree structure for encoding a filtering rule, in accordance with an embodiment of the present invention.
Figure 14:
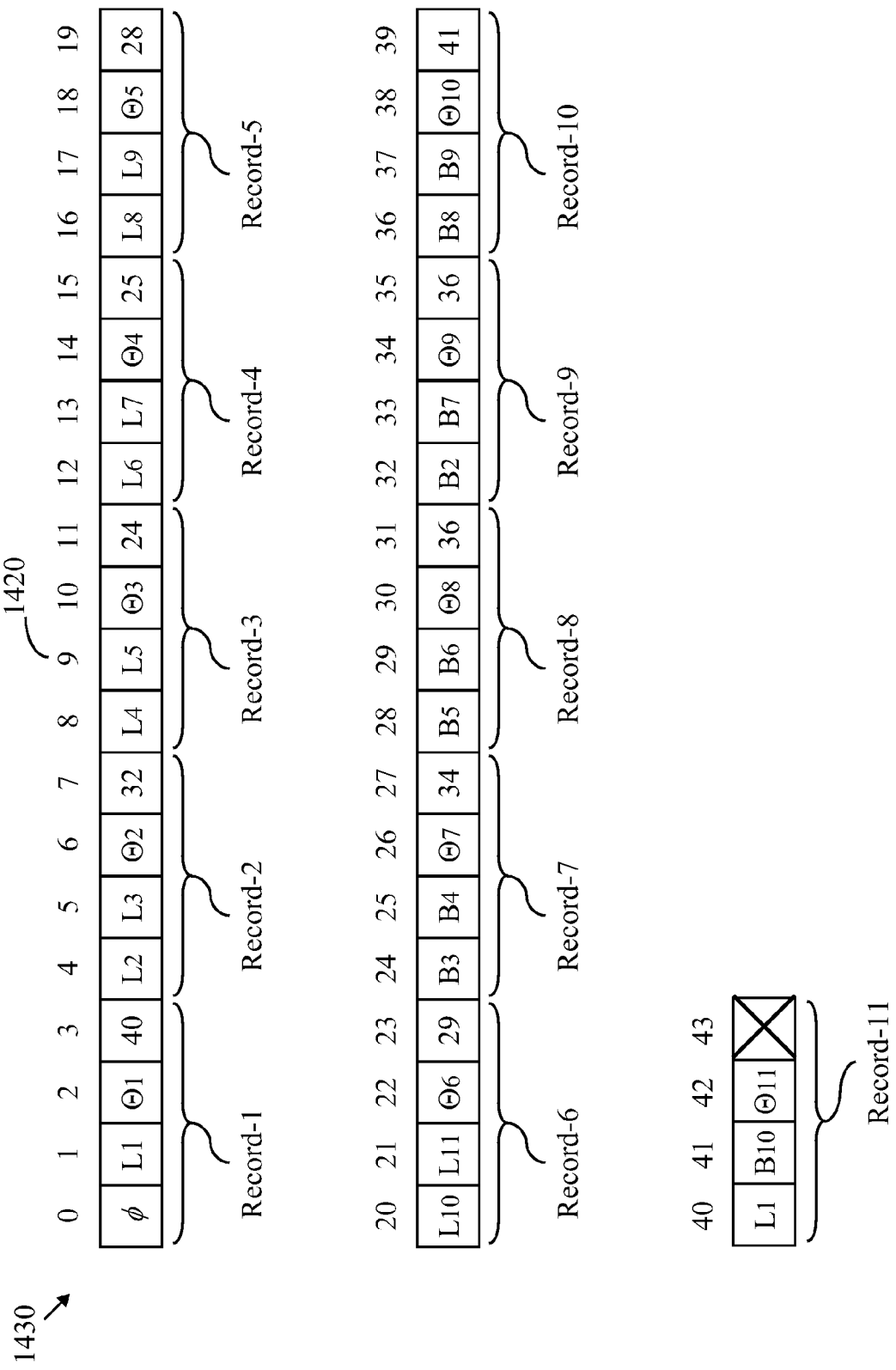
FIG. 14 illustrates the first data structure of FIG. 12 applied to the second exemplary rule-tree of FIG. 13.

FIG. 13 illustrates a second exemplary rule tree 1300 corresponding to a Boolean expression of eleven leaves (filters) denoted L1 to L11, and FIG. 14 illustrates a template array 1430, similar to the template array 1230 of FIG. 12, applied to the rule tree of FIG. 13 with an index 1420 ranging from 0 to 43. The rule tree 1300 comprises ten operators denoted $\Theta_2$ to $\Theta_{11}$. The first leaf, L1, is an operand of operator $\Theta_{11}$, which has no successor. For uniformity, a first record (denoted as Record 1 in FIG. 14) of template array 1430 of FIG. 14 representing the rule tree 1300 is conceptually viewed to include operand L1 together with a "don't care" operand $\phi$ and a permissive non-existent operator $\Theta_1$, which conveys the value of L1 as an operand of successor operator $\Theta_{11}$. As known in the art, a "don't care" value assigned to the operand $\phi$, may be conveniently either a "true" state or a "false" state. The remaining ten records, Record-2 to Record-11 of template array 1430, correspond to operators $\Theta_2$ to $\Theta_{11}$. Each entry L1, L2, to L11, in template array 1430 of FIG. 14 is an index (pointer) to a filter. As described above, with reference to FIG. 12, an input organizing module 522 associated with user interface 520 of FIG. 5 arranges the records so that the records can be processed sequentially with each record having already determined operands.

Figure 15:
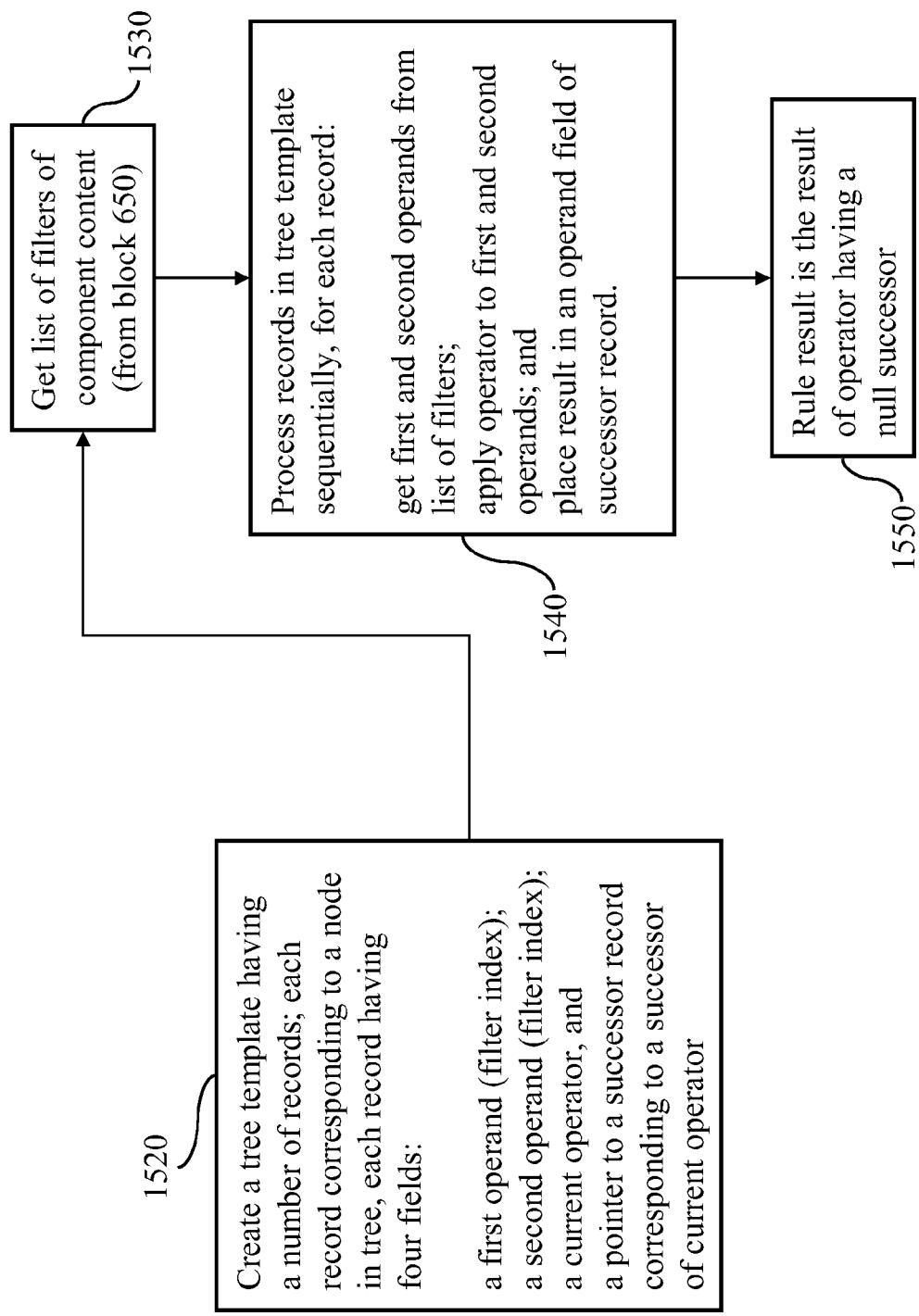
FIG. 15 illustrates a process of applying the first data structure exemplified in FIG. 12 and FIG. 14, in accordance with an embodiment of the present invention.

FIG. 15 summarizes the tree encoding method using the template array 1230 (FIG. 12) or 1430 (FIG. 14). In step 1520, a template having a number of records, each corresponding to a node in the tree is created. Each record comprises four fields containing indices of two filters, a current operator, and a pointer to a successor record corresponding to a successor of the current operator. In step 1530, a list of filters determined according to the process of FIG. 6 is prepared for a container under consideration. In step 1540, the records of the tree template are processed sequentially. The operands of each record are acquired by indexing the list of filters. A respective operator is applied to the operands and the binary result is placed in an operand field of a successor record. In step 1550, the result of the operator of the last record is presented as the result of the Boolean expression represented by the tree.

Figure 16:
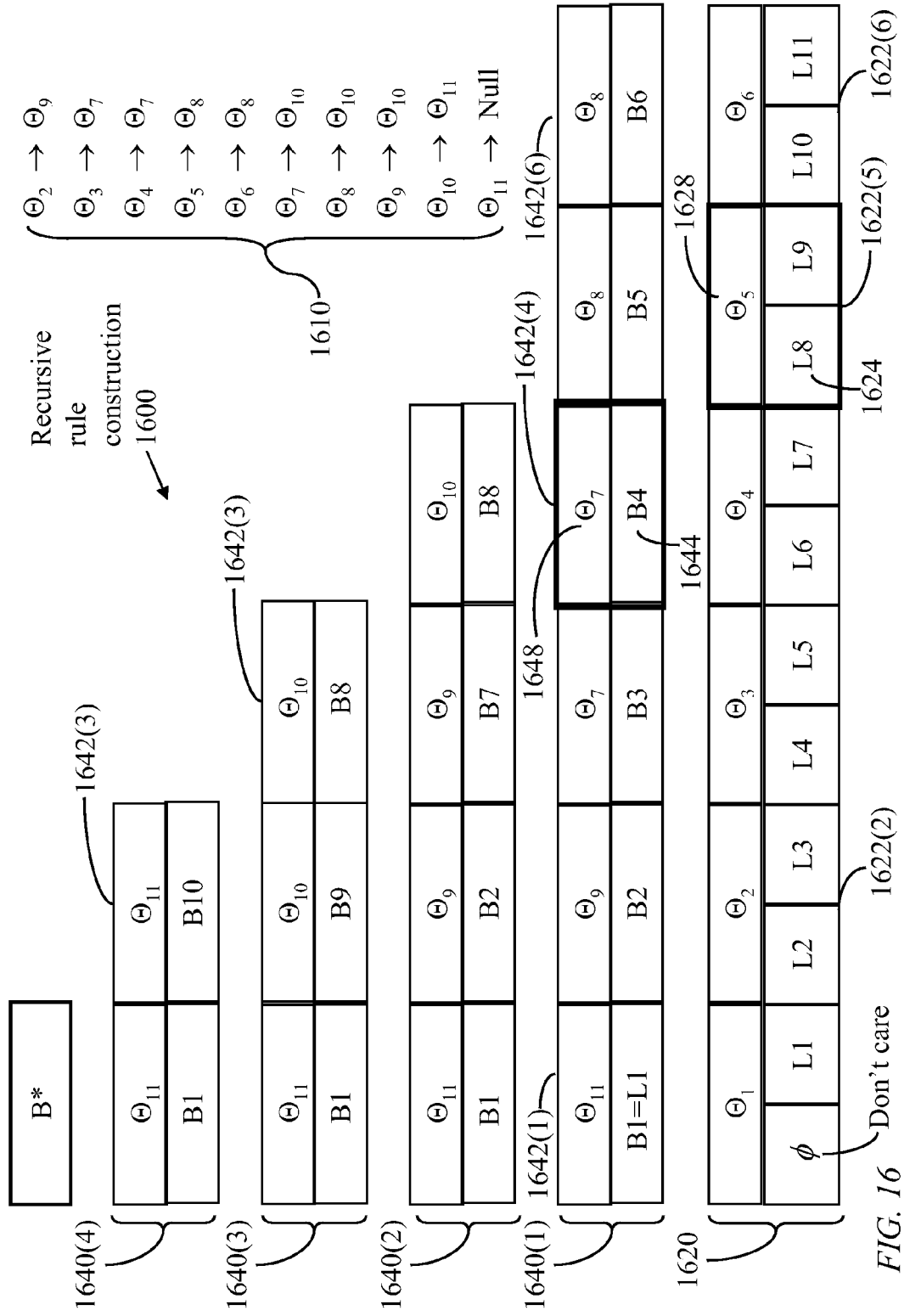
FIG. 16 illustrates a second data structure for encoding a rule tree, in accordance with an embodiment of the present invention.

FIG. 16 illustrates an alternative method of representing a rule tree structure according to an embodiment of the present invention. A set of filters (conditions) relevant to a rule is defined based on content descriptors, descriptor criteria and filter operators as described earlier. Definitions of the set of filters are stored in a filter-definition array. A set of Boolean operators is defined with one operator designated a null successor and each other operator designated a successor from the set of operators. The filters form leaves of a tree and are divided into subsets of filters where the filters of a subset form operands of a Boolean operator from among the set of Boolean operators. Notably, if each subset of filters includes two filters, then the total number of Boolean operators equals the total number of filters minus 1.

Considering a set of M filters, M>1, a template of a leaf vector comprising N leaf records is formed; 1<N<M. Each leaf record includes a leaf operator from among the set of operators and a respective subset of the filters. At the installation stage, each leaf record includes an operator and indices of the operands (filters) in the filter definition array. The values of the filters of each leaf record are determined for individual container components.

A node vector having a number of node records equal to the number N of leaf records is formed. Each node record has a node-operator field and a node-state field. At the installation stage, the node records are empty, containing no data. The Boolean operators and the node states of the node records are initially determined during processing of the leaf records. The N node records may be arranged in any order. However, it is convenient to let the node records initially have a one-to-one correspondence to the leaf records. Thus, the Boolean operator of node record j is a successor the Boolean operator of leaf vector j, $1 \leq j \leq N$.

Upon determining the values of the filters, each leaf operator is applied to respective filters (respective binary conditions) and a result is placed in a node-state field of a node record. A successor of each leaf operator is placed in node-operator field of the node record.

After processing all leaf records, the node records are processed. Node records, herein called connected node records, having a common operator are then identified. The common operator is then applied to the node states of all the connected node records to produce a new state. The operator field of a selected node record, from the connected node records, is replaced by a successor of the common operator and the node-state field of the selected node record is replaced by the new state just determined. The remaining connected node records are deleted from the node vector. Thus, with the replacement of each set of connected node record with a combined node record, the number of node records in the node vector is reduced. The process of identifying connected node records continues recursively until the node vector contains only one node record. The result of applying the Boolean operator in the operator field of the remaining one node record is the result of evaluating the Boolean expression. The Boolean operator of the last node record has a null successor.

FIG. 16 illustrates a recursive rule construction 1600 for encoding a rule tree for the exemplary tree of FIG. 13, which represents a Boolean expression of eleven filters forming the leaves of the tree. The leaves (filters) are denoted L1 to L11. In the tree of FIG. 13, leaf L1 is not associated with any other leaf. For uniformity, leaf L1 is artificially associated with a leaf, φ, with which it shares a passive operator $\Theta_1$. The inserted leaf φ is assigned a "don't care" value. As well known in the art, a "don't care" value may be conveniently assigned either a "true" state or a "false" state.

A set of Boolean operators $\Theta_2$ to $\Theta_{11}$ is defined by a user. Operators $\Theta_2$ to $\Theta_6$ are associated with leaf records while operators $\Theta_7$ to $\Theta_{11}$ are associated with node records. Operator $\Theta_{11}$ has a null successor and each other operator $\Theta_2$ to $\Theta_{10}$ has a successor from the set of operators $\Theta_7$ to $\Theta_{11}$ as illustrated in list 1610 of FIG. 16.

The leaf vector 1620 comprises six records 1622, individually identified as 1622(1) to 1622(6), assigned operators $\Theta_1$ to $\Theta_6$ placed in the operator fields 1624(1) to 1624(6) with indices of corresponding operands placed in operand fields 1626(1) to 1626(12). The operands in the operand fields of the six leaf records are {φ, L1}, {L2, L3}, {L4, L5}, {L6, L7}, {L8, L9}, and {L10, L11}.

When the binary values of the filters are determined (FIG. 5 and FIG. 6), the leaf records 1622 are processed. Starting with leaf record 1622(1), the artificial passive operator $\Theta_1$ simply passes the value of L1 to the node-state field of node record 1642(1). Operator $\Theta_{11}$, which is the successor of $\Theta_1$, is placed in the operator field of node record 1642(1). The second leaf record 1622(2) is then processed where operator $\Theta_2$ is applied to leaves L2 and L3 (filters L2 and L3) to produce a binary value B2 to be placed in the node-state field of node record 1642(2). The successor of operator $\Theta_2$, which is operator $\Theta_9$, is placed in the operator field of node record 1622(2). The process continues until all the node records 1642(1) to 1642(6) are determined.

The process continues recursively using only the node vector 1640; the leaf vector 1620 is no longer needed. The operator $\Theta_{11}$ in node record 1642(1) is not paired in the node vector 1640(1). Thus, node record 1642(1) remains unchanged. Likewise, node record 1642(2) remains unchanged because none of the node records 1642 includes an operator $\Theta_9$. Node records 1642(3) and 1642(4) have a common operator $\Theta_7$, which is applied to operands B3 and B4 to produce a binary result B7 to be placed in the node-state field of node record 1642(3), replacing B3. The successor operator of operator $\Theta_7$, which is $\Theta_9$, is placed in the operator field of record 1642(3), replacing $\Theta_7$. Node record 1642(4), which is now consumed in the new combined record 1642(3), is deleted. Likewise, node records 1642(5) and 1642(6) are combined in a new node record having the successor operator $\Theta_{10}$ of operator $\Theta_8$ and a node state B8 determined by applying the common operator $\Theta_8$ to operands B5 and B6. The node vector 1640 now shrinks to four node records identified by the reference numeral 1640(2). Node record 1640(2) simply over-writes node record 1640(1).

The process continues recursively with node records 1642(2) and 1642(3) combined to produce new combined node record 1642(2) while node records 1642(1) and 1642(4) remain unchanged; the two unchanged node records are now records 1642(1) and 1642(3) in the reduced node vector 1640(3).

Node records 1642(2) and 1642(3) have a common operator $\Theta_{10}$. Operator $\Theta_{10}$ is applied to operands B9 and B8 to produce a new state B10 which is placed in the node-state field of node record 1642(2). The successor operator $\Theta_{11}$ of operator $\Theta_{10}$ is placed in the node operator field of node record 1642(2). The common operator $\Theta_{11}$ of node records 1642(1) and 1642(2) is applied to operands B1 and B10 to produce the output B* of the Boolean expression.

Figure 17:
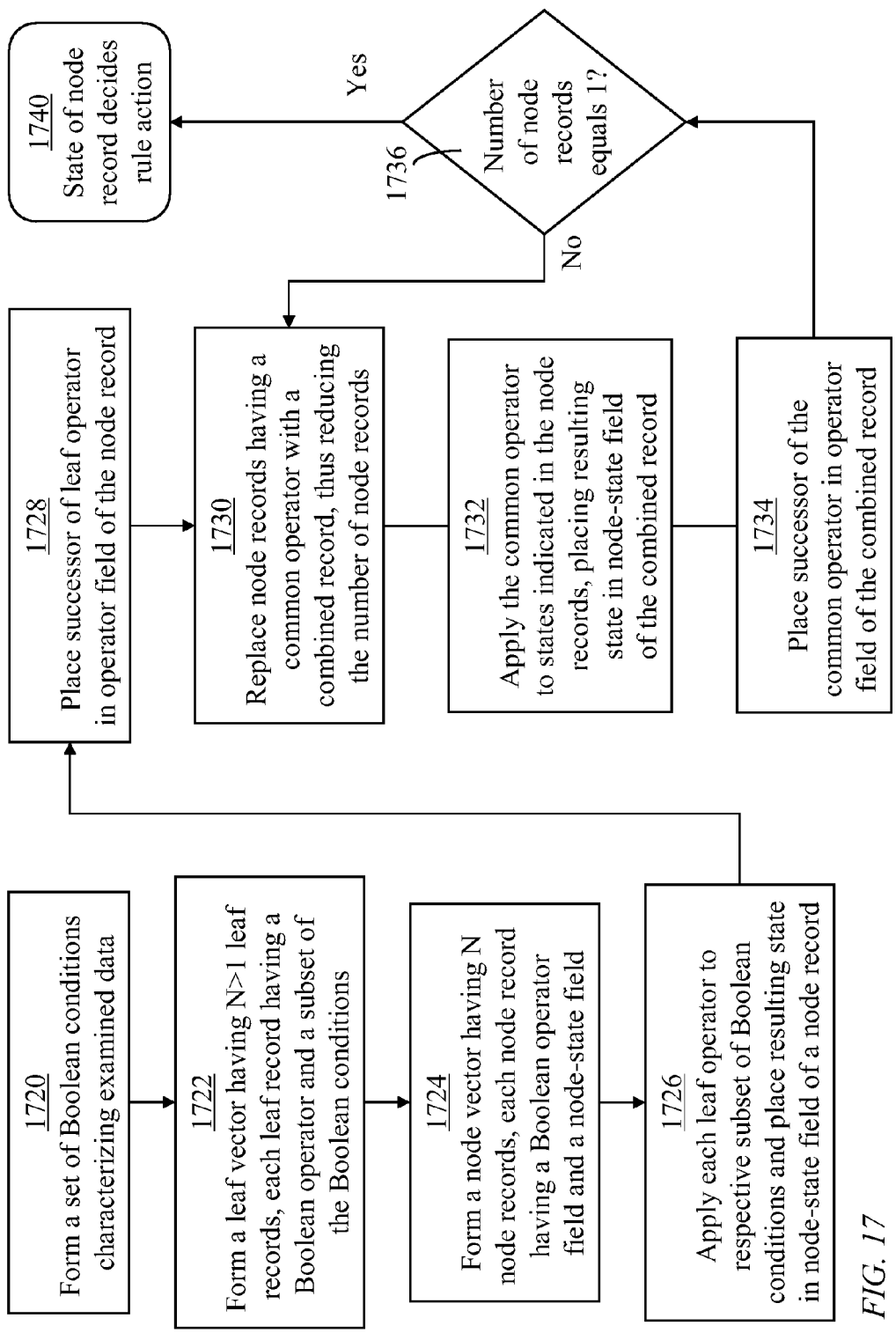
FIG. 17 illustrates a process of applying the second data structure exemplified in FIG. 16, in accordance with an embodiment of the present invention.

FIG. 17 illustrates the process of determining the output of a rule tree using the leaf-vector template 1620 and node-vector template 1640 of FIG. 16. In step 1720, the set of Boolean conditions (Boolean filters L2 to L11) characterizing the data content under consideration are determined. In step 1722 leaf vector 1620 having N>1 leaf records 1622 is formed. Each leaf record 1622 includes a Boolean-operator field 1624 and fields for a subset of Boolean conditions (a subset of filters L2 to L11). In step 1724 a node vector 1640 of N node records 1642 is formed. Each node record 1642 includes a Boolean operator field 1644 and a node-state field 1648. In step 1726, each leaf operator is applied to a respective subset of Boolean conditions (Boolean filters) which are determined from characteristics of content data as described above with reference to FIG. 5 and FIG. 6. The binary result is placed in a node-state field of a selected node record 1642. In step 1728, a successor of each leaf operator is placed in the operator field of the selected node record. In step 1730, node records having a common operator are replaced with a combined record, thus reducing the number of node records 1642 of the node vector 1640. In step 1732, the common operator is applied to the node states of the replaced node records and the binary result is placed in operator field of the combined record. In step 1734, a successor of the common operator, determined from list 1610 of FIG. 16, is placed in the operator field of the combined node record. In step 1736, if the number of remaining node records is larger than 1, step 1730 is revisited to continue the process of combining node records of a common operator. If the number of remaining records is 1, the operator of the remaining node record is applied to the node-states of the node record, and the result determines whether an editing action need be performed (step 1740).

Figure 18:
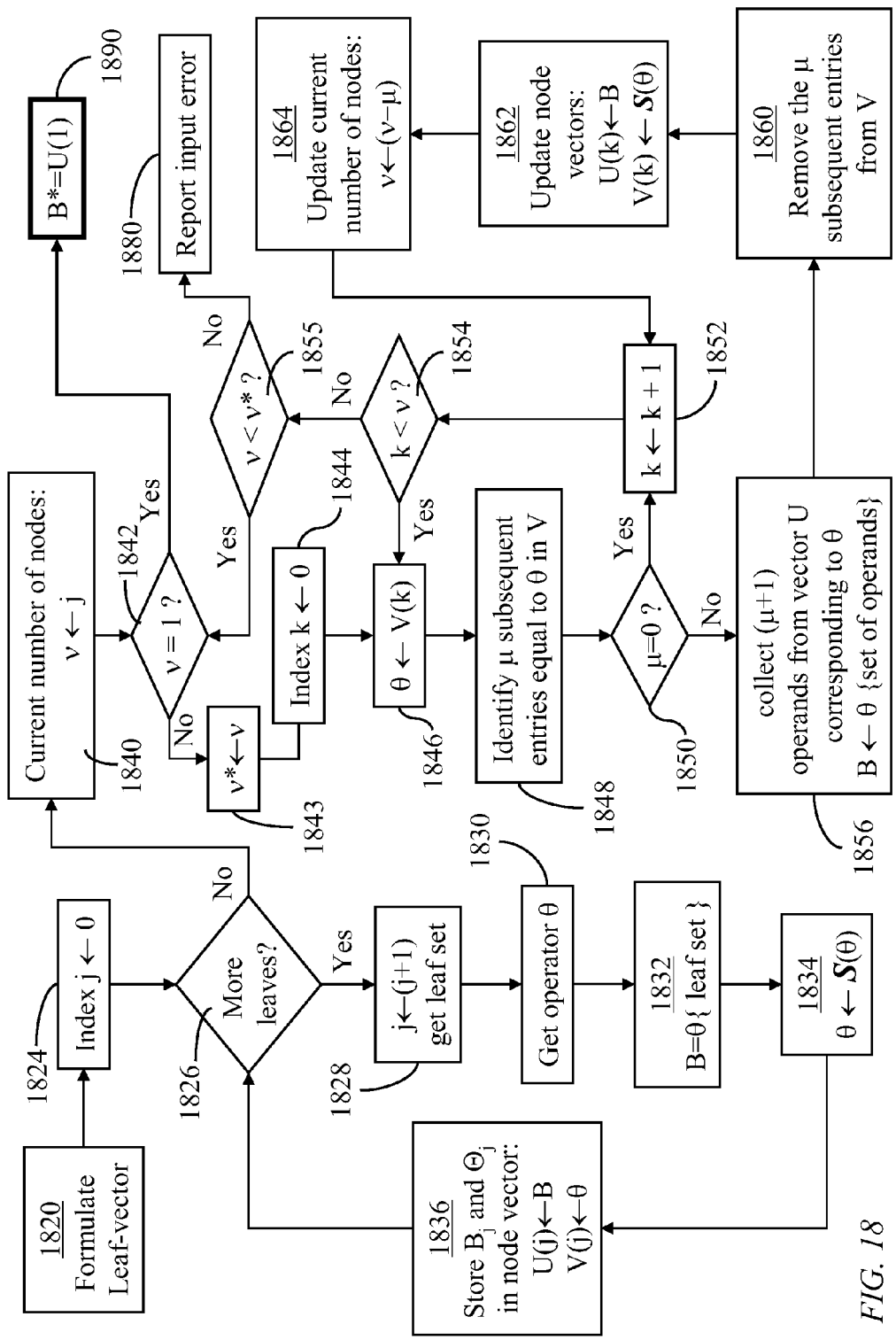
FIG. 18 illustrates a process of using a rule tree to determine a rule result, in accordance with an embodiment of the present invention.

FIG. 18 is a flow chart detailing the process of FIG. 17. In step 1820, to be detailed in FIG. 19, a leaf-vector 1620 is formulated. The leaf records 1622 (1) to 1622(N) are considered sequentially. In step 1824, and index j is set to equal 0. If step 1826 determines that more leaf records are to be processed, step 1828 increases index j by 1 and acquires a leaf set (a filter set) corresponding to leaf indices of a current leaf record and step 1830 acquires the operator θ (one of the operators $\Theta_1$ to $\Theta_6$) of the current leaf record. Step 1832 applies the operator to the acquired leaf set, resulting in a binary output B. In step 1834, successor S(θ) is determined from list 1610 of FIG. 16.

The node-state fields and the operator fields of node vector 1640 are herein denoted U(j), V(j), $1 \leq j \leq N$, i.e., U(j) and V(j) define node record 1642(j), $1 \leq j \leq N$. In step 1836, the value of B is placed in node-state field U(j) of node-vector 1640 and the value of S(θ) is placed in operator field V(j) of node vector 1640. When all leaf records 1622(1) to 1622(N) are processed, the index j equals the number of leaf records N and each node record 1642 of node vector 1640 has a respective node operator and a node state. In step 1840, the current number ν of node records 1642 of node vector 1640 is set to equal j (which equals N). In step 1842, if the current number of node records ν is larger than 1, the node vector is scanned to collect all node records 1642 having the same operator and combine such records. Before scanning, a current number ν*=ν of node records is noted (step 1843) to enable detecting a change in the number of node records. An index k is set to equal zero in step 1844, and step 1846 records operator θ=V(k) of node record 1642(k). Step 1848 examines subsequent node records of the node vector 1640 to identify a number, μ, of subsequent node records having the same operator θ. If the number μ of identified subsequent node records is zero (step 1850), the index k is increased by 1 in step 1852 and if the index k is less than the current number ν of node records, step 1846 is revisited. Otherwise, step 1856 collects the (μ+1) operands of the node records of the same operator θ and applies the operators θ to the (μ+1) operands to determine a new state B of a combined node record. In step 1860, the subsequent μ identified node records are deleted and step 1862 inserts the new state B in the node-state field U(k) of node record 1642(k) and a successor operator S(θ) in the operator field V(k) of node record 1642(k). The number of remaining node records is determined as (ν−μ) in step 1864. Steps 1852 and 1854 are applied after step 1864 to determine if the node vector 1640 contains further node records of a common operator. If step 1854 determines that k is less than ν, scanning the node vector continues from step 1846. Otherwise, if step 1854 determines that k=ν (k cannot exceed ν), step 1855 ensures that the current value of ν (last updated in step 1864) is less than the previous value ν*. Otherwise, an error is reported in step 1880. Notably, the requirement ν<ν* of step 1855 is not met if the user-provided representation of the Boolean expression is incorrect. If ν<ν*, step 1855 is followed by step 1842. If step 1842 determines that the number of remaining node records is 1, the operator of the remaining node record is applied to respective operands to determine a state B* (step 1890), which determines a respective editing action.

Figure 19:
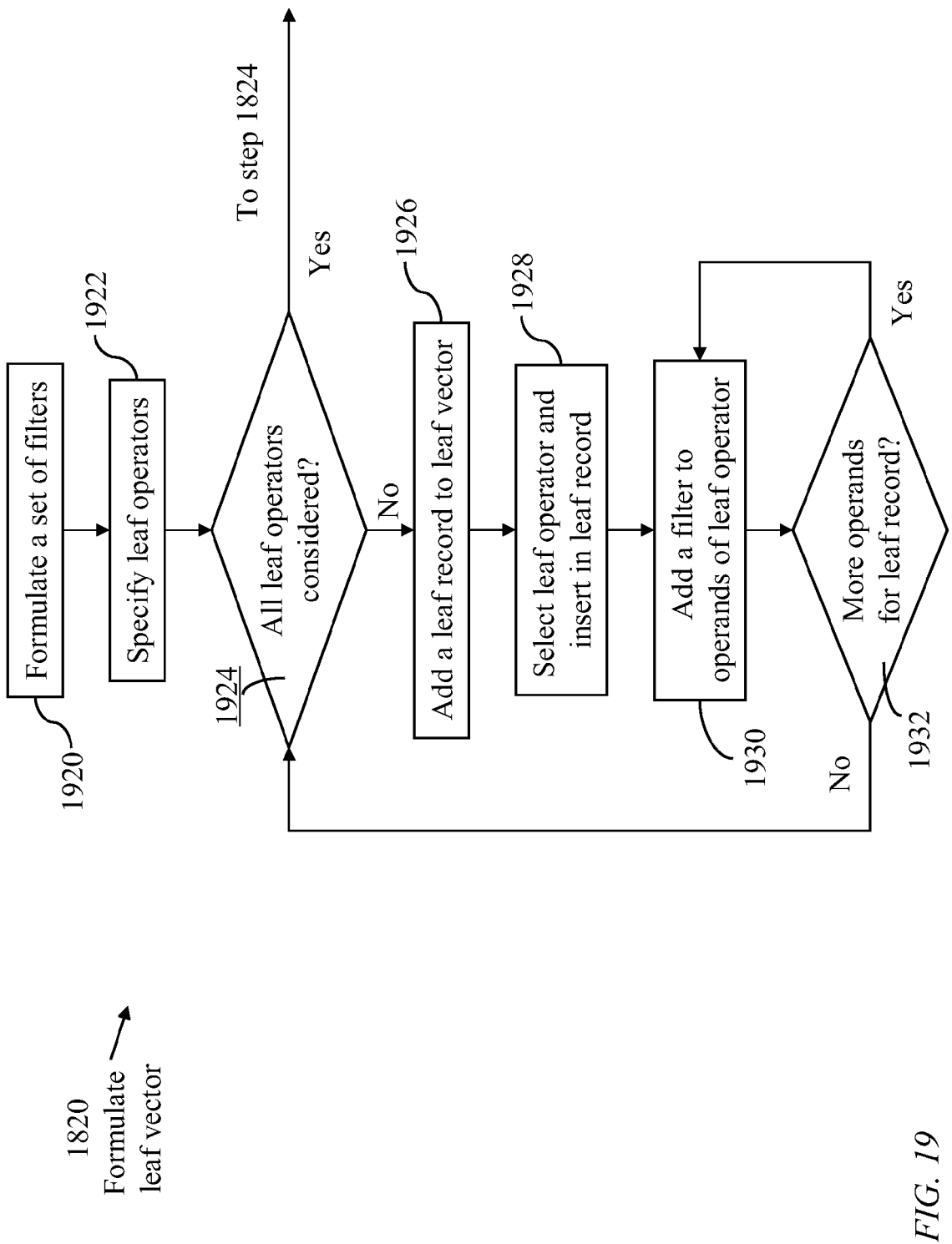
FIG. 19 details a step of forming a leaf vector associated with the process of FIG. 18, in accordance with an embodiment of the present invention.

FIG. 19 details the step 1820 of FIG. 18 of formulating leaf vector 1620 of FIG. 16. In step 1920, a set of filters (conditions) is formulated and in step 1922 the leaf operators are determined based on user input as described with reference to FIG. 5 and FIG. 6. The leaf operators are applied sequentially to generate corresponding leaf records 1622. If step 1924 determines that at least one operator is not yet applied, step 1926 adds a new leaf record 1622 to the leaf vector. Step 1928 selects one of the remaining operators, and step 1930 adds a filter associated to an operand field 1624 of the leaf record. Step 1930 is repeated until step 1932 determines that all filters belonging to the selected operator have been included in the current leaf record 1622. When the current leaf record 1622 is completed, as determined in step 1932, step 1924 is revisited. When step 1924 determines that all leaf operators have been considered, the completed leaf vector 1620 is presented to step 1824 of FIG. 18.

Figure 20:
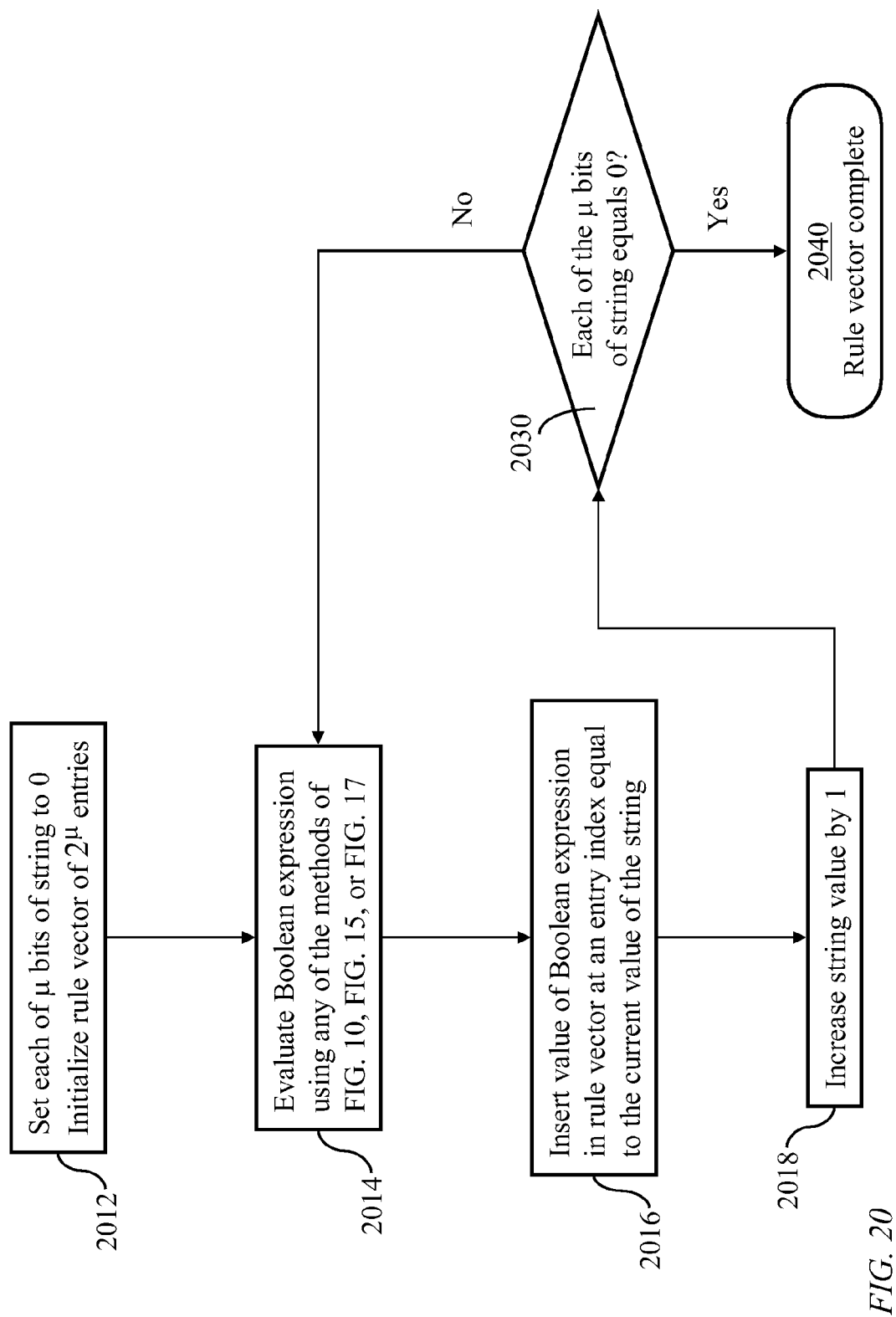
FIG. 20 illustrates a method of preprocessing Boolean expression for fast run-time rule execution, in accordance with an embodiment of the present invention.

FIG. 20 illustrates a method of pre-computing a binary value of a Boolean expression of a rule for each value of a set of filters. The set of filters is represented by a bit string having a number of bits bearing a one-to-one correspondence to the filters, so that each bit in the string corresponds to one filter. With μ>1 filters, the string contains μ bits and assume values ranging from 0 to $2^\mu - 1$. In step 2012, a starting string value of 0 (μ bits all set to zero) is set, and each entry of a rule vector having $2^\mu$ entries is initialized to "0". In step 2014, the Boolean expression is evaluated using one of the methods described with reference to FIG. 10, 15, or 17. In step 2016, the binary result ("true", "false") is stored in a rule vector at a position corresponding to a current value of the string (0 to $2^\mu - 1$). In step 2018, the string value is increased by adding 1. When step 2030 determines that each of the μ bits of the string has a value of 0, the generation of the rule vector is complete (step 2040). Notably, a string with each of the μ bits having a value of "1" corresponds to the $(2^\mu - 1)^{th}$ entry of the rule vector and adding 1 in step 2018 resets the string to μ zeros. Alternatively, the string may have (μ+1) bits with the most-significant bit used to indicate completion of the rule-vector generation. The rule vector may then be used to directly determine a binary value of a Boolean expression at run time, thus increasing the throughput of the content-filtering system.

In summary, the method of filtering contents of data containers then comprises the following steps:

(1) A set of filters (binary conditions) is defined where each filter is a function of a selected descriptor of the content and a respective criterion of the descriptor.

(2) A set of rules, each rule specifying a Boolean expression and a corresponding content-filtering action, is defined.

(3) The Boolean expressions are considered one at a time.

(4) Consider a Boolean expression of μ of filters (binary conditions). The filters are represented as a string of μ bits, μ>1.

(5) Evaluate the Boolean expression for each of $2^\mu$ values of the string to produce a rule vector of $2^\mu$ entries, each entry being a state of a content metric corresponding to one of the $2^\mu$ values of the string.

(6) Repeat step (5) for all Boolean expressions.

(7) Receive and parse a data container.

(8) Select a rule and determine values of the specified μ filters of the selected rule according to content of the data container.

(9) Index a rule vector corresponding to the selected rule and determine a value of the entry in the rule vector corresponding to an index determined by the string of μ bits.

(10) Execute a content-filtering action according to a value of the entry.

(11) Repeat steps (8) to (10) if a new rule need be applied to the received container.

Figure 21:
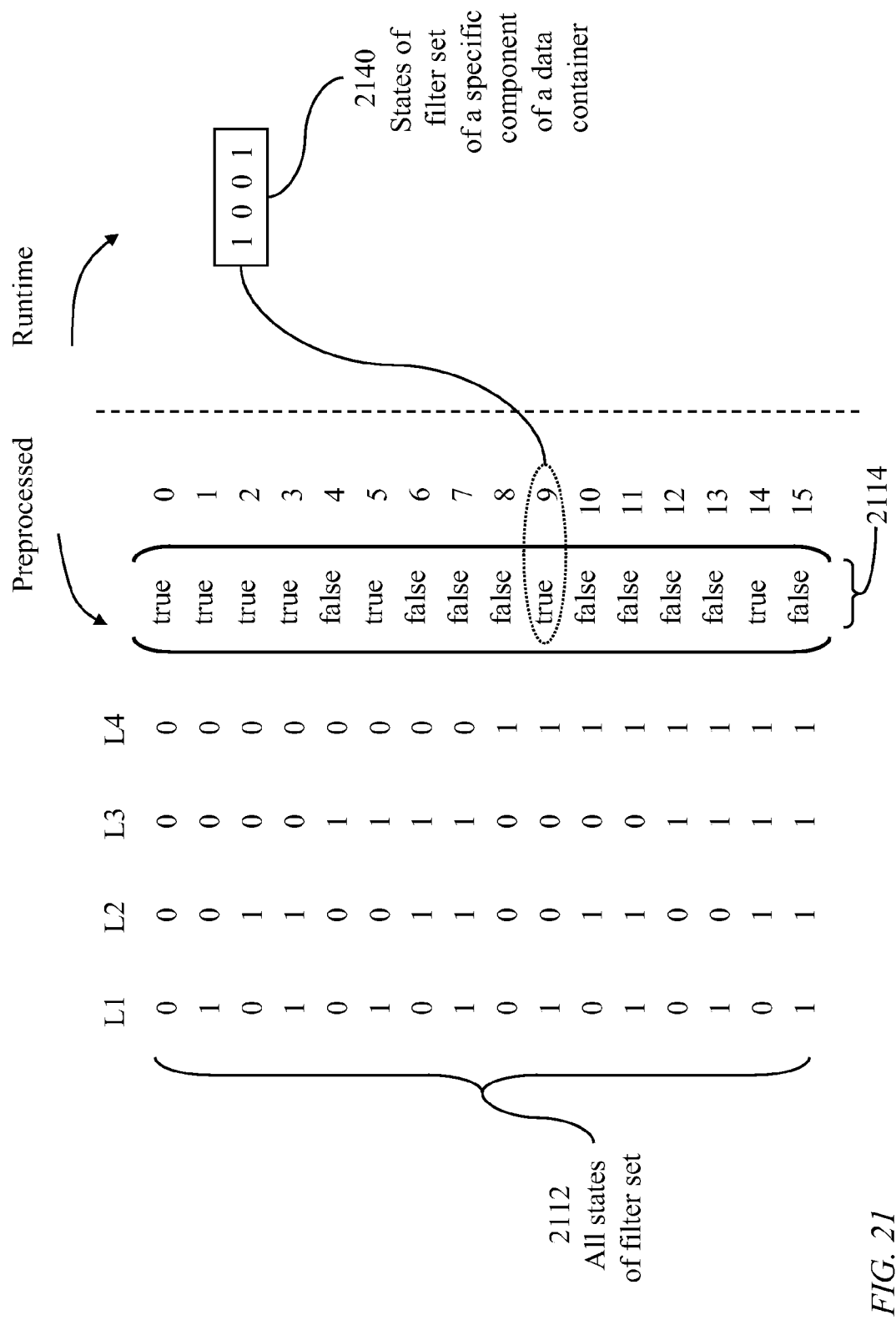
FIG. 21 illustrates an exemplary implementation of the method of FIG. 20.

FIG. 21 illustrates a rule vector for a rule specifying a Boolean expression of a set of four filters (μ=4) denoted L1, L2, L3, and L4. The set of filters is represented by a string of four bits. The Boolean expression is evaluated for each of the 16 values 2112 of the string, ranging from '0000' to '1111' to yield a binary output 2114(j), indicated as "true" or "false", corresponding to string value j, $0 \leq j < \mu$ of the string.

Upon receiving a container, the content of a container component is examined to determine a set of four filters for the rule considered in FIG. 21. If, for example, the set of four filters have values of "1", "0", "0", and "1", yielding a string 2140 of "1001", the value of the Boolean expression is read directly from position 9 (binary 1001) of the binary rule vector 2114.

The method of FIG. 20, with the exemplary illustration of FIG. 21, is suitable for rules employing Boolean expressions of a moderate number of operands (filters). For example, with 8 filters, the binary rule vector 2114 would be relatively short, having only 256 bits. If a Boolean expression has more than 16 operands, for example, it may be preferable to evaluate the Boolean expression each time it is needed rather than storing a large binary rule vector. A number of operands, per Boolean expression, exceeding 16 may be unlikely.

Figure 22:
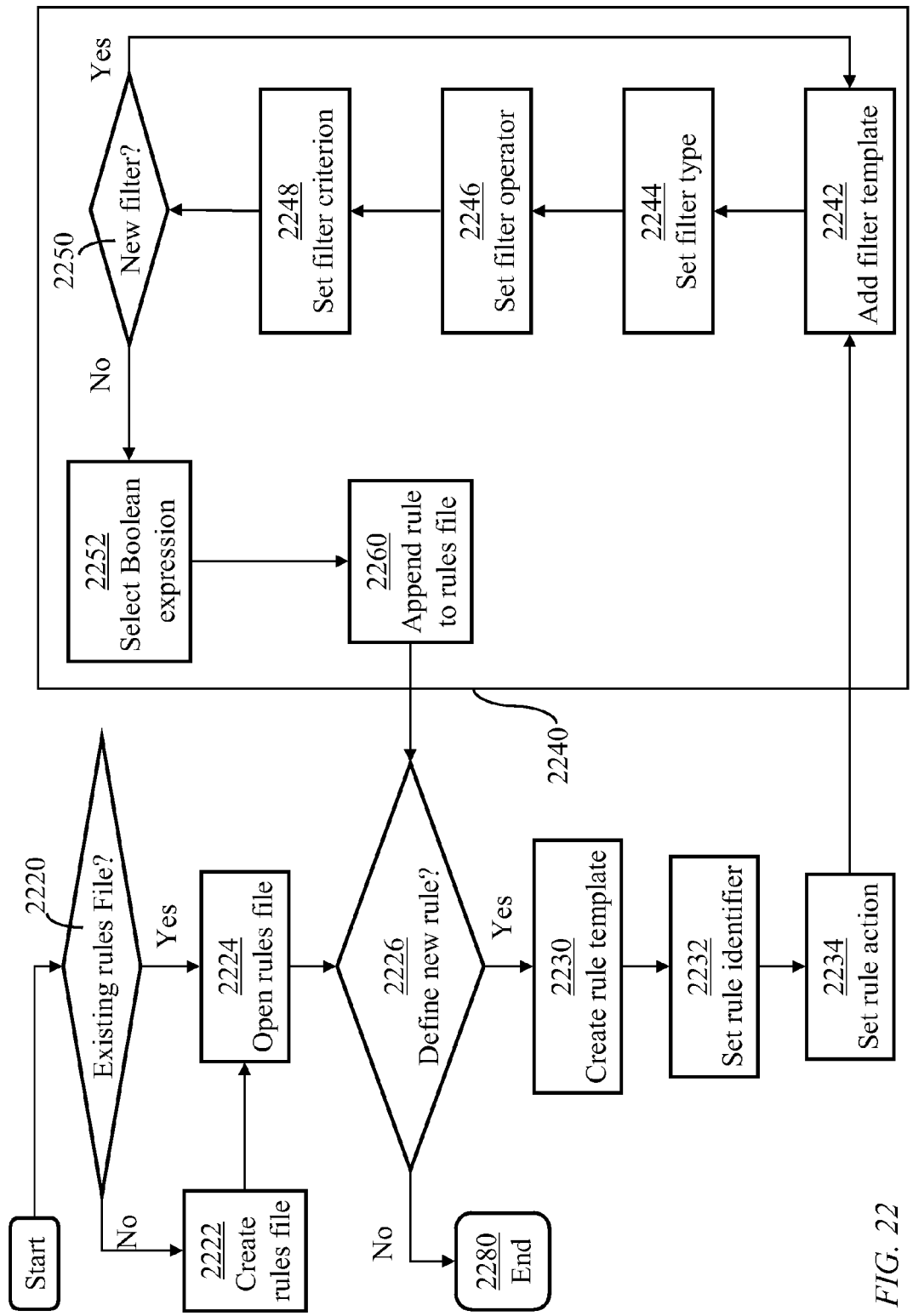
FIG. 22 illustrates a process of data entry relevant to filter definitions and rule definitions, in accordance with an embodiment of the present invention.

FIG. 22 illustrates a process of data entry relevant to filter definitions and rule definitions. The process starts with determining whether a rules file has already been created (step 2220). If a rules file has not yet been created, step 2222 creates a file using conventional methods known in the art. The next step is to add rules to the rules file. Populating or updating the rule file starts in step 2224. Step 2224 opens the rules file and directs the process to step 2226, which prompts a user to indicate whether a new rule is to be encoded and added to the rule file. Populating or updating the rule file is terminated by the user (step 2280). If more rules are to be added, a data-acquisition module (not illustrated) placed in the user interface 520 (FIG. 5) or in the operation, administration, and maintenance module 230 (FIG. 2) creates a rule template (step 2230). The rule template may optionally take one of many forms, which may be decided by the user. The form of a rule template depends on: (1) whether rules specified by the user are to be applied sequentially or according to a hierarchical order; and (2) whether the Boolean expression of a rule is to be entered in an algebraic-analytical format or in a tree-structure format where a node of a tree represents an operator and respective operands. In either case, the data-acquisition module may provide a respective template with instructions to facilitate data entry. For example, the data-acquisition module may guide the user into constructing an algebraic form of a Boolean expression by prompting the user to enter simple operations, each comprising an operator and a set of operands, then progressing towards the desired expression. The validity of the constructed expression may be verified with each addition of a new operator. If the Boolean expression is presented as a tree-structure, the data-acquisition module may display a generic tree structure, which may be pruned and validated as the user enters data relevant to selected nodes of the tree.

In step 2232, a rule identifier, encoded in any suitable format, is provided. In step 2234, a rule action is specified, and step 2240 defines a Boolean expression associated with the rule. The rule action of a specific rule is applied according to a value of the associated Boolean expression. Step 2240 comprises steps 2242, 2244, 2246, 2248, 2250, 2252, and 2260. Step 2242 created a filter template as illustrated in FIG. 3, reference numeral 340. Step 2244 sets a type of the filter, which may be one of many descriptors of a content of a container under consideration. Step 2246 sets the filter's operator, which may be selected from a menu of unary operators, binary operators, arithmetic operators, comparison operators, logical operators, set operators, and user-defined operators. Step 2248 sets the filter's criterion, which is a target value or a threshold relevant to a descriptor selected in step 2244. Step 2250 prompts the user to either define a new filter for the rule or proceed towards defining the Boolean expression to be applied to the set of filters so far specified. To add another filter, steps 2242 to 2248 are revisited until the user determines in step 2250 that all relevant filters are present. Step 2252 prompts the user to enter the Boolean expression according to one of the formats described above. It is noted that a rule may be based on only one filter, as illustrated in FIG. 9, in which case the Boolean expression reduces to a passive operator, which simply uses the value of the single filter to determine whether the rule action specified in step 2234 is to be applied.

Step 2260 appends the rule just constructed to the rule file opened in step 2224. It is noted that the values of the filters of each rule thus constructed are to be determined at "run time" upon processing received containers. The encoded rules includes filters identifiers, which may simply be indices of an array (not illustrated) storing the filters.

The process of FIG. 22 is performed during system installation or update. The rules encoded and stored in the rules file are activated in "real-time".

Figure 23:
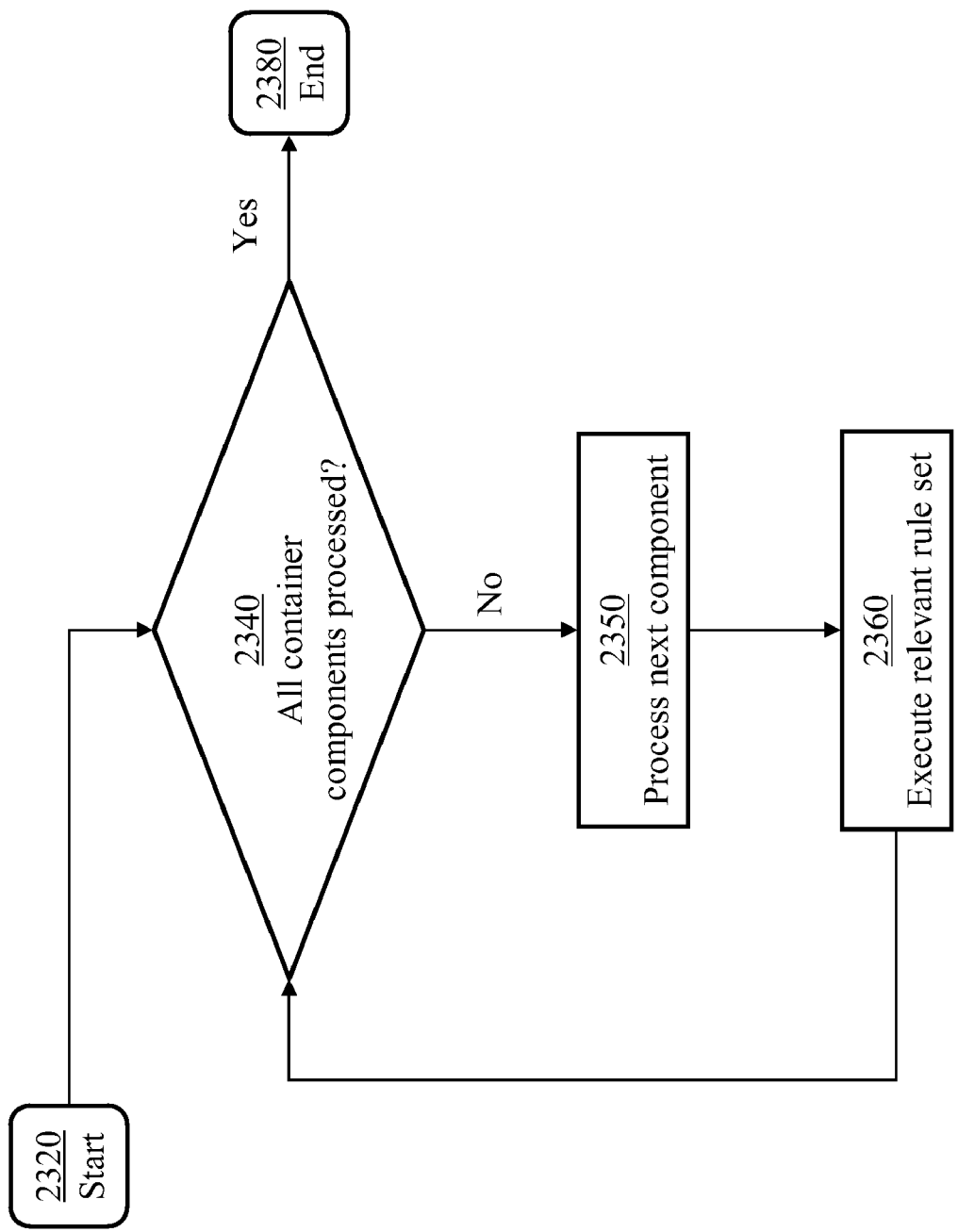
FIG. 23 illustrates a process of sequential filtering of components of a multimedia container.

FIG. 23 illustrates a process of sequential filtering of components of a received multimedia container having a number of components. The order of processing of the components of the container for content filtering is arbitrary and may be set by the user. The order of processing of components would be consequential if an overall constraint on the entire container is imposed for some operational reasons.

The process of content filtering starts in step 2320 when prompted by a controller 240 (FIG. 2). Having selected the order, in which the components are to be processed, step 2340 determines whether at least one component is yet to be processed in step 2350. Otherwise, step 2380 ends the process and reports results. In step 2360, all rules of a rule set applicable to a component under consideration are executed, and step 2340 is revisited to determine whether another component need be processed. A module inserts a notification indicating any filtering action applied to a component.

Figure 24:
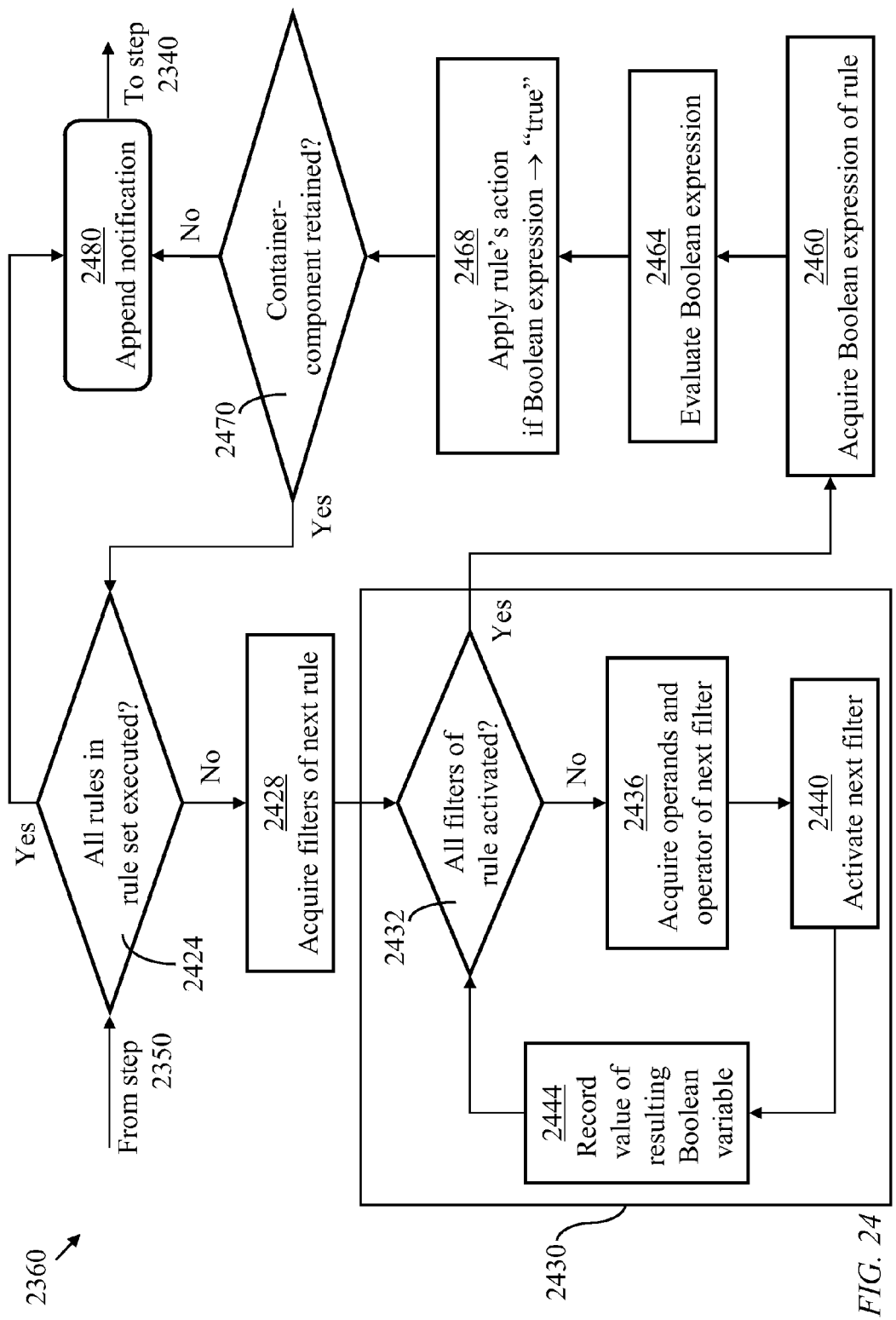
FIG. 24 illustrates a process of applying multiple rules for content filtering, in accordance with an embodiment of the present invention.

FIG. 24 details the step 2360 (FIG. 23) where a set of rules is applied to content of a container. Step 2360 applies to a component of a container. Step 2424 determines whether the entire rule set has been applied. If so, step 2480 appends a notification to the container indicating any content-filtering actions resulting from executing the set of rules. Otherwise, step 2428 selects a current rule and acquires definitions of all relevant filters associated with the selected current rule. Notably, the rules may be arranged in a specific order if the result of one rule influences selection of another rule. Additionally, the rule inter-dependence may be represented by a formal graph rather than a simple array as will be described with reference to FIG. 25.

Step 2430 executes the selected current rule. Step 2430 includes steps 2432, 2436, 2440, and 2444. Step 2432 determines whether all filters identified in step 2428 have been activated to determine a binary value of each filter. A filter is said to be activated when its operator is applied to respective operands to produce a binary value of the filter. If all filters relevant to the current rule have been activated, step 2432 transfers control to step 2460. Otherwise, steps 2436, 2440, and 2444 are exercised to produce a value of a filter under consideration. Step 2436 acquires the operator and values of respective operands based on characteristics of the container content under consideration as described with reference to FIG. 5 and FIG. 6. Step 2440 applies the operator to the operands, and step 2444 records the value of the current filter for use in evaluating the Boolean expression of current rule.

Step 2460 acquires the Boolean expression according to one of the encoding methods of FIG. 10, FIG. 15, or FIG. 17. Step 2464 evaluates the Boolean expression. Step 2468 may apply the content-filtering action associated with the current rule to the content of the content under consideration subject to the value of the Boolean expression as determined in step 2464. In step 2470, if the content-filtering action of the current rule results in deleting the entire container component, then there is no need to execute subsequent rules, if any, and step 2360 appends a respective notification to the deleted component. If the content is not edited, or edited but not deleted, step 2424 is revisited to determine whether more rules need be applied to the content under consideration. Notably, an entire component may be deleted if it has an attachment exceeding a certain threshold, or if it has a malicious insertion that cannot be removed.

Rules Inter-Dependence

In general, rules applicable to a specific content may have complementing actions, conflicting actions, or mutually-exclusive actions. With complementing actions, the content-filtering result may be independent of the sequence of implementing the rules. With conflicting actions or mutually-exclusive actions, one action supersedes another. In accordance with an embodiment of the present invention, a user may be prompted to define the inter-relationship of rules using a graph.

Figure 25:
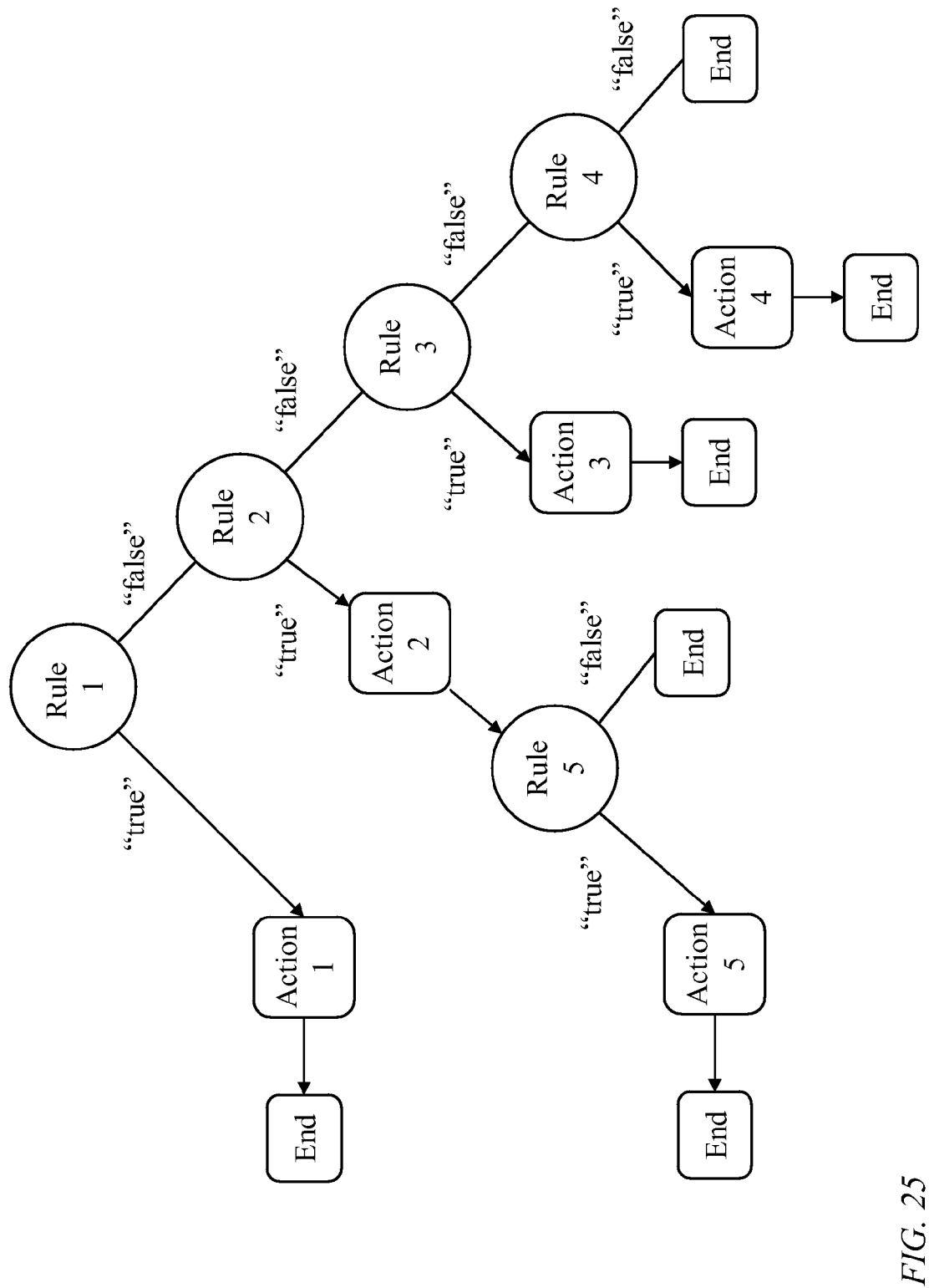
FIG. 25 illustrates a graph depicting interdependence of rules determining content-filtering actions, in accordance with an embodiment of the present invention.

FIG. 25 illustrates a graph indicating a hierarchical arrangement of five rules denoted Rule 1 to Rule 5. A state of a rule is herein defined as the binary value resulting from executing the Boolean expression of the rule.

A state of "true" of Rule 1 results in an action labeled "action 1" after which step 2360 is considered complete. "Action 1" may call for one of two opposing extremes; the first being deleting the entire component either because it is too large or is irreparable, or determining that the component is acceptable because it is too short to contain malicious insertions. A state of "false" of Rule 1 indicates that the content passes a first test and should be subjected to a second test of Rule 2.

A state of "true" of Rule 2 results in an action labeled "action 2" followed by implementing Rule 5. A state of "false" of Rule 2 indicates that the content passes the second test and should be subjected to a third test of Rule 3, and so on. The process ends without editing the content if the state of Rule 4 is "false". The process may also end after implementing (only) one: {action 1}, {action 2 and action 5", "action 3", and "action 5".

Figure 26:
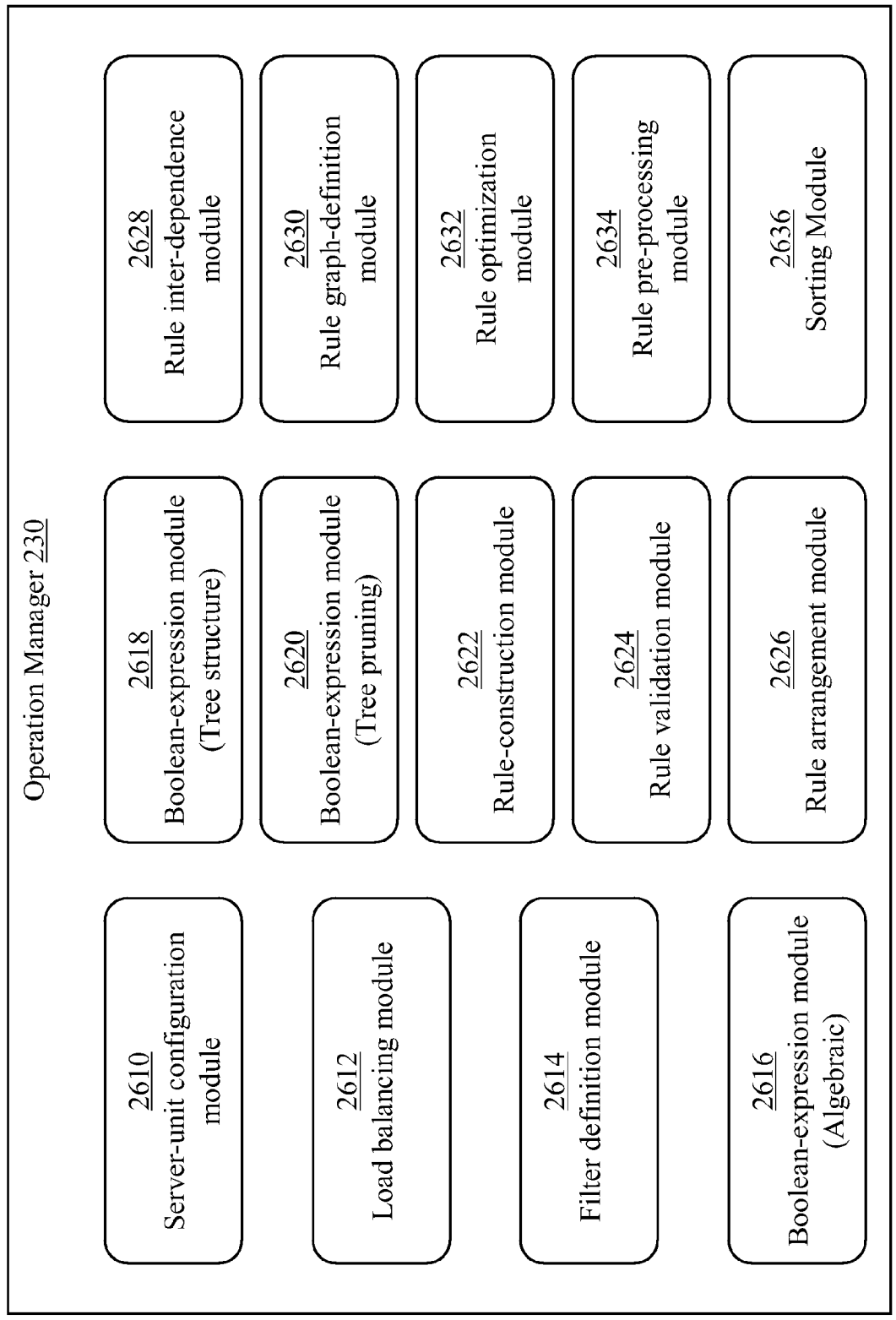
FIG. 26 illustrates modules of an operation manager of the engine of FIG. 2, in accordance with an embodiment of the present invention.

FIG. 26 illustrates modules, listed below, used by the operation manager 230. Each module comprises computer readable instructions stored in a computer readable storage medium.

(1) Server-unit configuration module 2610 for configuring a server unit to accept multimedia data containers formed according to a specified protocol.

(2) Load balancing module 2612 for equitably distributing multimedia data containers among server units identically-configured to process data containers of a common type.

(3) A filter-definition module 2614 for acquisition of definitions of a set of filters from a user, each filter specifying a definition of a content descriptor, a descriptor criterion, and an operator.

(4) Boolean-expression acquisition module 2616 for enabling a user to provide a Boolean expression according to algebraic syntax.

(5) Boolean-expression acquisition module 2618 for enabling a user to provide a Boolean expression in the form of a tree structure.

(6) Boolean-expression acquisition module 2620 for enabling a user to enter a Boolean expression by editing and pruning a drawing of a generic tree, where each node of a tree representing an operator and a respective set of operands.

(7) Rule-construction module 2622 for acquisition of a set of content-filtering rules from a user, each rule specifying a Boolean expression of a subset of filters and a filtering action.

(8) Rule-validation module 2624 for validating correctness of a Boolean expression specified for a rule.

(9) Rule-arrangement module 2626 for arranging rules in an order according to which a specific filtering action performed by a rule precludes execution of at least one subsequent rule.

(10) Rule inter-dependence module 2628 for prompting a user to specify a successive rule of a given rule conditional on a value of a respective Boolean expression of the given rule.

(11) Rule graph-definition module 2630 for presenting a set of content-filtering rules in the form of a formal graph (FIG. 25).

(12) Rule-optimization module 2632 for optimizing a Boolean expression of each rule, using conventional logic-optimization techniques, to minimize processing effort.

(13) Rule pre-processing module 2634 for selecting specific rules each specifying a subset of filters comprising at most a preset number of filters, evaluating, for each of the specific rules, a Boolean expression of a subset of filters for all values of the subset of filters to produce an array of $2^m$ bits, m>1 being a number of filters in the subset of filters, and storing the array of bits in a memory device (FIGS. 20 and 21).

(14) Sorting module 2636 for sorting containers into container types, each container type corresponding to a protocol according to which a container is formulated at source, and directing containers of a specific type to a specific controller from among a plurality of controllers. The sorting module 2636 may be associated with the network interface 210 or the operation manager 230.

Figure 27:
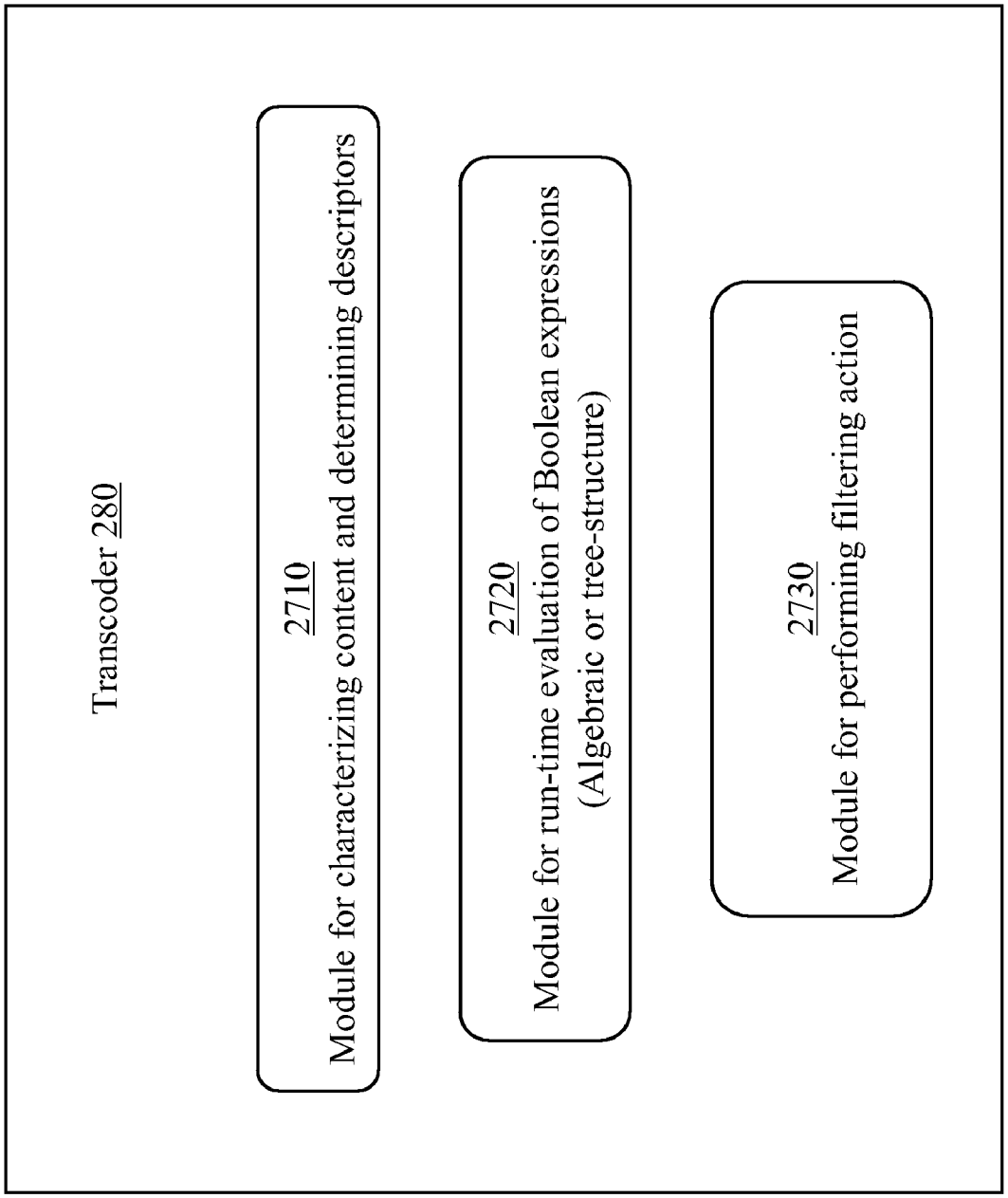
FIG. 27 illustrates modules of a transcoder of the engine of FIG. 2, in accordance with an embodiment of the present invention.

FIG. 27 illustrates modules, listed below, used by a transcoder 280, in accordance with an embodiment of the invention. Each module comprises computer readable instructions stored in a computer readable storage medium.

(a) Module 2710 for characterizing content of each component of a multimedia data container, determining content descriptors, applying an operator, and determining a state of a filter.

(b) Module 2720 for run-time evaluation of Boolean expressions and determining a binary output of a rule. The Boolean expression may be presented according to algebraic syntax or as a tree structure.

Figure 28:
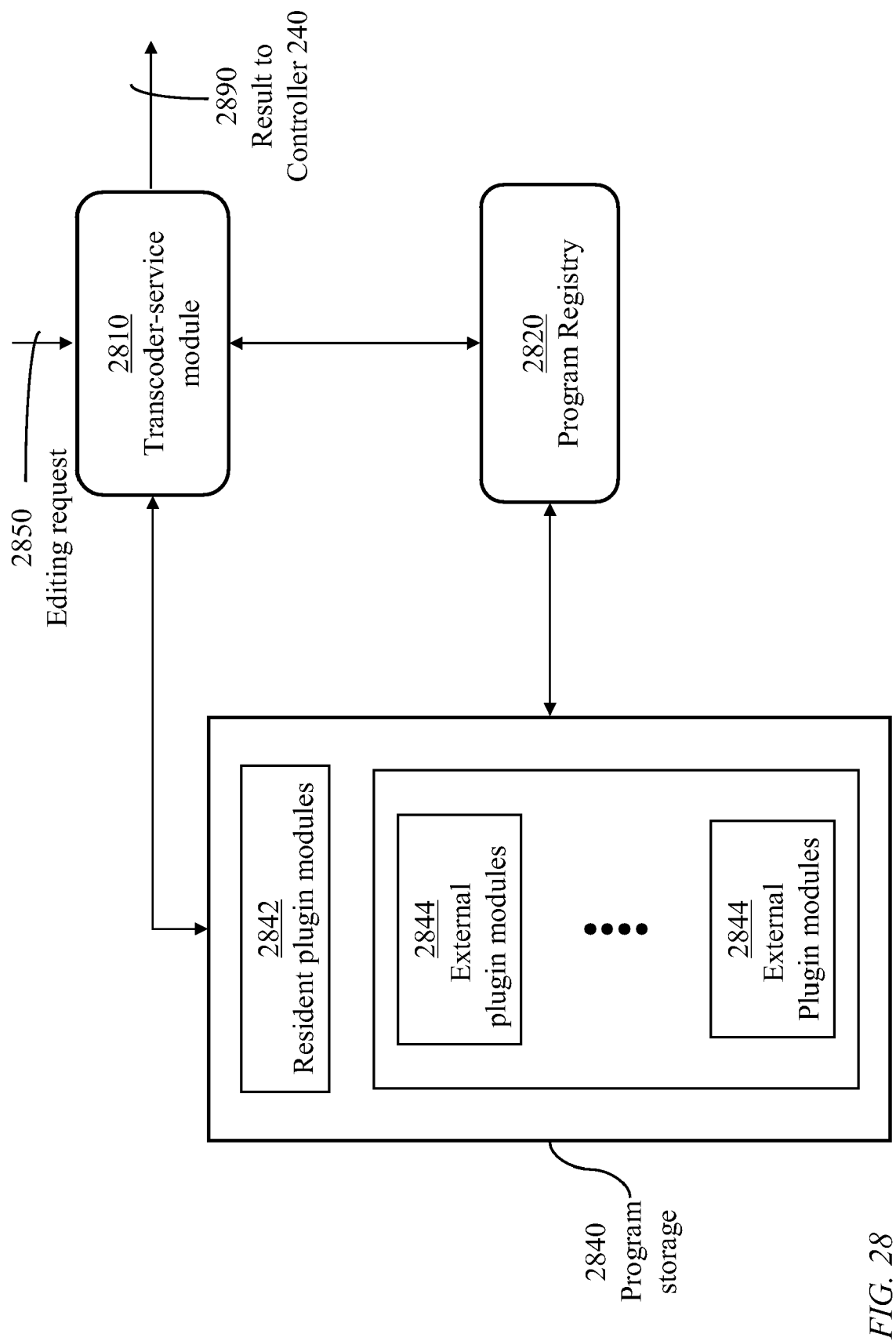
FIG. 28 illustrates modules of a transcoder of the engine of FIG. 2, in accordance with an embodiment of the present invention.

(c) Module 2730 for performing a filtering action relevant to a given container content, subject to a preset value a Boolean expression of a respective rule FIG. 28 illustrates a transcoder 280 comprising a transcoder-service module 2810, a program registry 2820, and program storage 2840, in accordance with an embodiment of the invention. The transcoder-service module comprises computer readable instructions stored in a computer readable storage medium, which, when executed, cause a core of the processor to: receive a specific container and an editing request from a specific controller from the plurality of controllers; select and execute programs relevant to the editing request; and return a result to the specific controller. The program registry comprises computer readable instructions which, when executed, causes a processor to organize programs according to respective functions; and replace existing programs with respective new programs.

A controller 240 (FIG. 2) forwards an editing request to a transcoder 280. Upon receiving an editing request 2850, the transcoder-service module 2810 identifies which plugin program to execute using information contained in the editing request. The transcoder-service module 2810 executes the selected plugin program and returns the result to a respective controller 240.

A "plugin" is defined herein as a self-contained module devised to perform a specific task. Program storage 2840 comprises computer readable instructions stored in a computer readable storage medium and includes two types of plugins:

(a) resident plugins 2842 which are loaded initially; and
(b) external plugins 2844 which are loaded dynamically, external plugins may replace resident plugins.

Resident plugins provide basic functions, and external plugins provide additional functions, content filtering and virus scanning are two examples of such functions.

Plugins are registered with the program registry 2820 which manages plugin registration and access. The program registry 2820 organizes plugins based on their characteristics. Plugins may be arranged in plugin groups.

Plugin programs organize execution of plugins in a predefined fashion. Plugin programs are built from a simple set of instructions which determine the execution logic for a predefined set of plugins having specific goals.

An example of instructions of a simple program that uses plugins is presented next.

(01) OnErrorGoto TERMINATION_PLUGIN
(02) Execute DEFAULT_SETUP_INITIAL_PROFILE
(03) Execute DEFAULT_SETUP_SESSION
(04) Execute DEFAULT_PRE_PROCESS_DECODE_PLUGIN
(05) ExecuteGroup GROUP_HOT_PIPELINE_DUAL_LOAD_AROUND_CREATE
(06) Execute DEFAULT_TRANSFORMER_PLUGIN
(07) Execute DEFAULT_CREATOR_PLUGIN
(08) ExecuteGroup GROUP_HOT_PIPELINE_CREATOR
(09) ExecuteGroup GROUP_HOT_PIPELINE_DUAL_LOAD_AROUND_CREATE
(10) Execute DEFAULT_CHARGE_DATA_RECORD_PLUGIN
(11) Execute DEFAULT_OPTIMISER_PLUGIN
(12) ExecuteGroup GROUP_HOT_PIPELINE_ANALYSER
(13) Execute DEFAULT_ENCODE_PLUGIN
(14) Label TERMINATION_PLUGIN
(15) Execute DEFAULT_CHARACTERIZE_PLUGIN
(16) ExecuteGroup GROUP_HOT_PIPELINE_TERMINATOR
(17) Execute DEFAULT_UNSETUP_SESSION
(18) Execute DEFAULT_CHARGE_DATA_RECORD_PLUGIN It is noted that the numbers on the left are introduced only for ease of reference and do not necessarily constitute a part of the instructions.

Each "Execute" command has the name of a plugin as an argument that always refers to resident plugin names. An external plugin is never directly referenced by name since it is optional, and is thus executed only if present. Each "ExecuteGroup" command has the name of a plugin group as argument. Command "Execute Group" executes all the plugins that belong to that group.

Line 1 states that on any error the program is to jump to line 14 and resume execution with lines 15 to 18. Lines 2 and 3 perform setup of the adaptation to be done; Line 4 performs decoding of input if required, for example if the input is EMAIL then it is broken into its sub-components; Line 5 and line 9 execute a plugin group to which Content Filtering plugin belongs to. So if present, it starts execution on line 5 and terminates on line 9; Line 6 and line 7 are used respectively to perform setup operations necessary for the creation of an adaptation pipeline and to actually create it. The adaptation pipeline contains a set of operations to be executed to perform the required adaptation; Line 8 is meant to execute any external plugin that has an effect on the adaptation pipeline before it is executed; Line 10 provides details of input components that will take part in the adaptation. Line 18 performs a similar task on the output components. Such information may be analyzed for reporting, billing and other purposes not necessarily related to the adaptation function; Line 11 performs adaptation-pipeline optimization; Line 12 executes any external plugin that performs analysis and optimization of the adaptation pipeline before its execution; Line 13 executes the adaptation pipeline; Line 15 characterizes the output components generated as a result of the execution of the adaptation pipeline; Line 16 executes any external plugin that has an effect on the output components that were generated; and Line 17 performs additional steps completing the adaptation (such as providing a detailed adaptation record).

Rules are permanently stored in "Rule Files". A rule file may apply to more than one controller. Content filtering, using a rule file, applies the rules contained in the rule file against media (content). If a given rule evaluates to "true", a corresponding action is performed. An action may include removing undesirable content such as viruses (including mobile specific viruses); removing media of a particular type (such as games); using third party applications to perform actions on media (such as scanning a media for viruses). However, a content of a particular type may pass-through without processing.

The definition of rules is done in the operation manager 230 (FIG. 2). The application of rules to affect content editing (filtering and adaptation) is done in a transcoder 280. Once a rule file is created then the user optionally configures one of the controllers 240 to send the rule file along with any adaptation request to a transcoder 280 it selects.

An action "Drop" ensures that a media is not part of the output of a content adaptation process. An action "scan keep" results in scanning a media for viruses. This assumes that the Anti-virus external plugin is installed. The media is actually "marked" as "scan for virus", so that at the point of the execution of the appropriate plugin program where the anti-virus plugin is executed all media marked as "scan for virus" are scanned for viruses.

An example of a rule called rule 1 is given below.

---

Rule Name="MaxFileSize50000" Action="Drop"
    Filter Type="MaxFileSize" Operator="GreaterThan" Value="50000"
    Filter FilterOperator="AND" Type="Family" Operator="NotEqual" Value="MESSAGE"

---

The name associated with rule 1 is "MaxFileSize50000" whereas the action corresponding to the rule is "Drop" for removing any media that match the filter(s) contained in the rule. This rule specifies two filters. The first filter is of type "MaxFileSize" that is applied against the size of a file. The filter operator is "GreaterThan" where as the value is "50000". The second filter is characterized by a type called "Family". This filter is applied against the media family (ex: IMAGE, AUDIO, etc). The operator associated with the filter is not "NotEqual" and the value is "MESSAGE. The filters are combined by using a boolean operator "AND". Thus, if a file has a size greater than 50000 and is not of family "MESSAGE" then the specified action is performed.

Another rule, called rule 2 is described next:

```
Rule Name="MaxFileSize25000AndContentTypes"
Action="Drop"
    Filter Type="MaxFileSize"
    Operator="GreaterThan"   Value="25000"
        BracketOpen
    FilterOperator="AND"
    Filter  Type="ContentType"
    Operator="Equals" Value="image/wbmp"
    Filter FilterOperator="OR"
    Type="ContentType" Operator="Equals"
    Value="image/png"
        BracketClose
```

The name of the rule is "MaxFileSize25000AndContentTypes" and the corresponding action is "Drop". The purpose of rule 2 is to remove any media that match the filter(s) contained in the rule. A detailed description of the structure of rule 2 is presented next.

Only the following filters are specified.

1st filter:
  filter type is "MaxFileSize" and the filter is applied against the size of a file;
  operator is "GreaterThan";
  the value is "25000";
Bracket Open with "AND" boolean filter operator
2nd filter:
  filter type is "ContentType" and the filter is applied against the content type (equivalent to mimetype) of a media;
  operator is "Equals";
  the value is "image/wbmp";
3rd filter:
  has boolean filter operator "OR";
  filter type is "ContentType" and the filter is applied against the content type (equivalent to mimetype) of a media;
  operator is "Equals";
  the value is "image/png";
Bracket Close.

Thus, if a file has a size greater than "25000" AND (has a content-type equal to "image/wbmp" OR has a content-type equal to image/png) then the action specified in the rule is performed. Actions can affect the media or any of its attachments if the media is a container such as an email or an MMS. Actions can include: keep (adapt the media); keep & scan (scan the media for viruses before adapting); drop (do not include the attachment in the final message); pass-through (do not adapt the media, leave it unchanged).

An example rule 3 that is defined in a common rule file is described next.

```
Rule Name="MaxFileSize300000" Action="Drop"
    Filter Type="MaxFileSize" Operator="GreaterThan" Value="300000"
```

Another example, rule 4, that completes that common rule file is presented.

```
Rule Name="VirusScan" Action="ScanKeep"
    Filter Type="Family" Operator="Equals" Value="MESSAGE"
```

In this case a common rule file contains:
  rule 3 which "drops" all files that have a size greater than 300000; and
  rule 4 which performs a virus scan on any media that are messages.

Consider a case where a common rule file is applied to all controllers and that some controller "X" has defined a rule file that contained rules 1 and 2. When sending an adaptation request to a selected Transcoder, that controller would send a rule file called "RuleFile1" that contained rules 1 to 4. The structure of "RuleFile1" is presented.

```
Rule Name="MaxFileSize50000" Action="Drop"
    Filter Type="MaxFileSize" Operator="GreaterThan" Value="50000"
    Filter FilterOperator="AND" Type="Family" Operator="NotEqual"
        Value="MESSAGE"
Rule Name="MaxFileSize25000AndContentTypes" Action="Drop"
    Filter Type="MaxFileSize" Operator="GreaterThan" Value="25000"
    BracketOpen FilterOperator="AND"
        Filter Type="ContentType" Operator="Equals"
Value="image/wbmp"
        Filter FilterOperator="OR" Type="ContentType"
            Operator="Equals" Value="image/png"
    BracketClose
Rule Name="MaxFileSize300000" Action="Drop"
    Filter Type="MaxFileSize" Operator="GreaterThan"
    Value="300000"
Rule Name="VirusScan" Action="ScanKeep"
    Filter Type="Family" Operator="Equals" Value="MESSAGE"
```

In the context of an embodiment that provides this feature, XML is used to manage the structure of rules inside rule files. This ensures portability and scalability. An XML version of RuleFile1 is presented next.

```
<?xml version="1.0" encoding="UTF-8"?>
<ContentFiltering xmlns:xsi="http://www.w3.org/2001/XMLSchema-
        instance" xsi:type="ContentFiltering">
    <CompatibilityVersion>7.0</CompatibilityVersion>
    <Version>7.0</Version>
    <Name>RuleFile1</Name>
    <FilterRule Name="MaxFileSize50000" Action="Drop">
        <Filter Type="MaxFileSize" Operator="GreaterThan"
Value="50000"/>
        <Filter FilterOperator="AND" Type="Family"
            Operator="NotEqual" Value="MESSAGE"/>
    </FilterRule>
    <FilterRule Name="MaxFileSize25000AndContentTypes"
Action="Drop">
        <Filter Type="MaxFileSize" Operator="GreaterThan"
Value="25000"/>
        <Bracket FilterOperator="AND">
            <Filter Type="ContentType" Operator="Equals"
                Value="image/wbmp"/>
            <Filter FilterOperator="OR" Type="ContentType"
Operator="Equals"        Value="image/png"/>
        </Bracket>
    </FilterRule>
    <FilterRule Name="MaxFileSize300000" Action="Drop">
        <Filter Type="MaxFileSize" Operator="GreaterThan"
Value="300000"/>
    </FilterRule>
    <FilterRule Name="VirusScan" Action="ScanKeep">
        <Filter Type="Family" Operator="Equals" Value="MESSAGE"/>
    </FilterRule>
</ContentFiltering>
```

An example of content filtering is presented below. Consider a multimedia container:
  MMS characteristics:
  Name: mms1.mms
  Family: MESSAGE Size: 171100
Content-type: application/vnd.wap.multipart.mixed
Number of attachments: 3
MMS attachment characteristics:
Name: image.jpg
Family: IMAGE
Size: 75000
Content-type: image/jpg
Name: image2.jpg
Family: IMAGE
Size: 45000
Content-type: image/jpg
Name: image.png
Family: IMAGE
Size: 50000
Content-type: image/png Content filtering is performed according to the following steps:
- the MMS goes through content filtering;
  - rule "VirusScan" evaluates to "true for this media since media belongs to family "MESSAGE";
  - media is marked as "scan for virus".
- the attachment image.jpg goes through content filtering:
  - a rule "MaxFileSize50000" evaluates to "true" since the media is not a message and its size is greater than 50000;
  - media is marked as "Drop".
- the attachment image2.jpg goes through content filtering:
  - none of the rules evaluates to "true" for this media;
- the second attachment image.png goes through content filtering:
  - a rule "MaxFileSize25000AndContentTypes" evaluates to "true" for this media since media has size greater than 25000 and has content-type "image/png";
  - media marked as "Drop".

The plugin program resumes after the execution of the content filtering plugin. This results in the scanning of the MMS media and its content for virus by the Anti-virus plugin. The adaptation process then starts. Consider the case where the adaptation and content filtering produce an output MMS that is of the following form.

MMS characteristics:
Name: mms1out.mms
Family: MESSAGE
Size: 25175
Content-type: application/vnd.wap.multipart.mixed
Number of attachments: 2
MMS attachment characteristics:
Name: image2.gif
Family: IMAGE
Size: 24000
Content-type: image/gif
Name: removal_notification.txt
Family: TEXT
Size: 75
Content-type: text/plain It is assumed that, as a result of content adaptation, "image2.jpg" was adapted to output "image2.gif". Note that both "image.jpg" and "image.png" were "dropped" and are not part of the output MMS resulting from the content filtering actions being applied. A new media "removal_notification.txt" is added to the output message. This results from the removal of "image.jpg" and "image.png". Transcoders are devised so that, upon removal of a media, an explanatory text notification is attached. This notification is intended to provide an explanation to the receiver of the MMS that some of the media originally in the MMS could not be adapted and were removed.

Anti-virus scanning is present in Transcoders in the form of an external plugin. In this case the plugin architecture is used to provide an interface to a third party anti-virus scanning engine such as McAffee or Kaspersky. The presence of the Anti-virus plugin is optional as with any external plugin. At the plugin program level, a plugin program that is meant to execute the Anti-virus plugin would contain a command that executes the plugin group to which the Anti-virus plugin belongs.

Execution of the anti-virus plugin does not automatically imply that the media will be scanned for viruses. Virus scanning is performed only on media that are marked as "scan for virus" by content filtering. Some third-party Anti-virus engines may be installed as stand-alone libraries. Other third-party Anti-virus engines may be installed as client-servers. The Anti-virus plugin would be written in such a way as to properly interface with the third-party Anti-virus engine. In any case, the anti-virus plugin is the transcoder's entry point to perform virus scanning on the media that go through content-adaptation.

Thus, in the above described embodiments, the following features have been provided: (1) ability to parse a message in order to check the attachments; (2) ability to characterize an attachment in order to filter it according to content type; and (3) accommodating a user-defined, expandable, and hierarchic set of rules to determine whether a media element is desirable or not.

Editing actions determine how media attachments are treated. The editing actions may include one or more of the following: presenting an attachment to the adaptation process; keeping an attachment and scanning the media for viruses before presenting to the adaptation process; and dropping an attachment. Editing actions may include invoking anti-virus and intrusion-prevention software programs.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A system for filtering content of multimedia data containers, comprising:
   a network interface for receiving said multimedia data containers from a network; and
   a plurality of server units, each server unit comprising a set of processors and a set of memory devices, having installed thereon:
      a filter-definition module, having computer readable instructions stored in a computer readable storage medium, for acquisition of definitions of a set of filters from a user, each filter specifying a definition of a content descriptor, a descriptor criterion, and an operator;
      a rule-construction module, having computer readable instructions stored in a computer readable storage medium, for acquisition of a set of content-filtering rules from said user, each rule specifying a Boolean expression of a subset of said filters and a filtering action;
      a module for characterizing content of each component of a multimedia data container, determining said content descriptor, applying said operator, and determining a state of said each filter;
a module for determining a binary output of each said rule; and
a module for performing a filtering action relevant to said content subject to a preset value of said binary output.

2. The system of claim 1, further comprising a module for configuring a server unit to accept multimedia data containers formed according to a specified protocol.

3. The system of claim 2, further comprising a module for equitably distributing multimedia data containers among server units identically-configured to process data containers of a common type.

4. The system of claim 1, further comprising a module for enabling said user to provide said Boolean expression according to algebraic syntax.

5. The system of claim 1, further comprising a module for enabling said user to provide said Boolean expression in the form of a tree structure.

6. The system of claim 1, further comprising a module for enabling said user to enter said Boolean expression by editing and pruning a drawing of a tree, each node of said tree representing an operator and a respective set of operands.

7. The system of claim 1, further comprising a module for validating correctness of said Boolean expression.

8. The system of claim 1, further comprising a module for arranging said rules in an order according to which a specific filtering action performed by a rule precludes execution of at least one subsequent rule.

9. The system of claim 1, further comprising a module for prompting said user to specify a successive rule of at least one of said rules conditional on a value of said Boolean expression.

10. The system of claim 1, further comprising a module for presenting said set of content-filtering rules in the form of a formal graph.

11. The system of claim 1, further comprising a module for optimizing said Boolean expression of said each rule.

12. The system of claim 1, further comprising a module for:
selecting specific rules each specifying a subset of filters comprising at most a preset number of filters;
evaluating, for each of said specific rules, said Boolean expression of a subset of filters for all values of the subset of filters to produce an array of $2^\mu$ bits, $\mu>1$ being a number of filters in said subset of filters; and
storing said array of bits in a memory device.

13. A method of filtering content of a data container, comprising:
specifying a set of binary conditions characterizing said content;
specifying a set of operators, with one operator designated a null successor and each other operator designated a successor from said set of operators;
forming a leaf vector comprising N>1 leaf records, each leaf record having a leaf operator from among said set of operators and a respective subset of said binary conditions;
forming a node vector of N node records, each having a node-operator field and a node-state field;
applying each leaf operator to respective binary conditions, placing result in node-state field of a node record;
placing a successor of said each leaf operator in node-operator field of said node record; and
recursively performing steps of:
replacing identified node records having a common operator with a combined record having a successor of said common operator; and
applying said common operator to entries of node-state field of said identified node records, placing resulting state in node-state field of said combined record.

14. The method of claim 13, further comprising determining a content index as said resulting state subject to said successor of said common operator being said null successor.

15. The method of claim 13, further comprising:
determining a number of node records of said node vector after said replacing; and
determining a content index as said resulting state corresponding to a number of node records equal to one.

16. The method of claim 15, further comprising performing a specified editing action relevant to said content according to a value of said content index.

17. The method of claim 16, further comprising:
receiving data characterizing a receiver of said data container;
ascertaining compatibility of said content with characteristics of said receiver; and
provided said content is incompatible with said characteristics, modifying said content according to said characteristics.

18. A method of filtering content of a data container, comprising:
defining a set of binary conditions where each binary condition is a function of a selected descriptor of said content and a respective criterion of said descriptor;
defining a set of Boolean expressions and corresponding content-filtering actions;
selecting a Boolean expression of specified $\mu$ binary conditions represented as a string of $\mu$ bits, $\mu>1$;
evaluating said Boolean expression for each of $2^\mu$ values of said string to produce a rule vector of $2^\mu$ entries, each entry being a state of a content metric corresponding to one of the $2^\mu$ values of said string;
receiving a data container;
determining values of said specified $\mu$ binary conditions according to content of said data container;
determining entry in said rule vector corresponding to an index determined by said specified $\mu$ binary conditions; and
executing a content-filtering action according to a value of said entry.

19. The method of claim 18, further comprising acquiring said Boolean expression in an algebraic format having Boolean operators, operands, and delimiters, wherein the step of evaluating comprises recursively executing steps of:
examining said Boolean expression to identify a simple pattern, said simple pattern enclosing a Boolean operator and two operands between two delimiters; and
provided said simple pattern is found:
applying said Boolean operator to said two operands to determine a binary value of said pattern; and
replacing said simple pattern and said two delimiters with said binary value.

20. The method of claim 18, further comprising acquiring said Boolean expression in a form of a tree structure having a plurality of nodes, wherein the step of evaluating comprises steps of:
creating a tree template having a plurality of records, each record corresponding to a respective node and having four fields for a first operand, a second operand, a current operator, and a successor record; and starting with a first record and proceeding sequentially towards a last record:
   applying an operator of a current record on respective binary values determined from a current value of said string to produce a new binary value;
   provided said current record is a last record, determining said new binary value as a value of said Boolean expression; and
   provided said current record is an intermediate record, placing said new binary value in an operand field of said successor record.

* * * * *